(12) United States Patent
Inno et al.

(10) Patent No.: US 6,632,589 B2
(45) Date of Patent: Oct. 14, 2003

(54) LITHOGRAPHIC PRINTING PROCESS

(75) Inventors: Toshifumi Inno, Shizuoka-ken (JP); Hiromichi Tachikawa, Shizuoka-ken (JP); Keiji Akiyama, Shizuoka-ken (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 127 days.

(21) Appl. No.: 09/835,563

(22) Filed: Apr. 17, 2001

(65) Prior Publication Data

US 2002/0012881 A1 Jan. 31, 2002

(30) Foreign Application Priority Data

Apr. 21, 2000 (JP) ........................................ 2000-120724
Jul. 17, 2000 (JP) ........................................ 2000-216547

(51) Int. Cl.$^7$ ............................... G03F 7/11; G03F 7/30
(52) U.S. Cl. ................. 430/303; 430/270.1; 430/271.1; 430/272.1; 430/273.1; 430/348; 430/401
(58) Field of Search .................. 430/270.1, 271.1, 430/272.1, 273.1, 302, 303, 348, 401, 494, 964

(56) References Cited

U.S. PATENT DOCUMENTS

| 5,417,749 | A | | 5/1995 | Krishnan et al. | |
|---|---|---|---|---|---|
| 5,939,237 | A | * | 8/1999 | Gardner, Jr. et al. | 430/273.1 |
| 6,090,524 | A | * | 7/2000 | Deboer et al. | 430/272.1 |
| 6,132,933 | A | * | 10/2000 | Nguyen | 430/272.1 |
| 6,136,508 | A | * | 10/2000 | DeBoer et al. | 430/302 |
| 6,207,348 | B1 | * | 3/2001 | Deboer et al. | 430/302 |
| 6,283,029 | B1 | * | 9/2001 | Tashiro et al. | 101/455 |
| 6,387,595 | B1 | * | 5/2002 | Teng | 430/302 |
| 6,410,208 | B1 | * | 6/2002 | Teng | 430/302 |
| 6,468,717 | B2 | * | 10/2002 | Kita et al. | 430/278.1 |
| 2002/0068240 | A1 | * | 6/2002 | Teng | 430/280.1 |
| 2002/0098447 | A1 | * | 7/2002 | Teng | 430/273.1 |

FOREIGN PATENT DOCUMENTS

| EP | 0 590 205 A1 | 4/1994 |
|---|---|---|
| EP | 0 941 839 A2 | 9/1999 |

* cited by examiner

*Primary Examiner*—Janet Baxter
*Assistant Examiner*—Barbaras Gilliam
(74) *Attorney, Agent, or Firm*—Burns, Doane, Swecker & Mathis, LLP

(57) ABSTRACT

A hydrophilic layer and an overcoat layer are provided in this order on a heat-sensitive layer having an ink receiving surface, so as to form an original (plate) for a lithographic printing plate. The overcoat layer can be removed during printing. A system capable of forming an inorganic hydrophilic matrix by sol-gel conversion is provided in the hydrophilic layer. Adhesion between the heat-sensitive layer and the hydrophilic layer decreases in a heated region through image processing. Emulsion ink is supplied to the plate surface during printing, whereby the overcoat layer and the hydrophilic layer at an image portion are removed with a hydrophilic component of the emulsion ink. Thus, with a heat-sensitive original that can be subjected to heat-mode prepress using laser exposure, good printed matter can be stably obtained, irrespective of balance between image and non-image portions, without using wetting water.

10 Claims, No Drawings

LITHOGRAPHIC PRINTING PROCESS

BACKGROUND OF THE INVENTION

1. Field of the Invention

The present invention relates to a printing process using a heat-sensitive lithographic printing plate and, more particularly, to a printing process using a lithographic printing plate, in which image recording can be conducted by scanning exposure based on a digital signal and image is formed in a lithographic printing original plate by processing with a simple printing machine, so that a printed matter can be stably obtained without using wetting water.

2. Description of the Related Art

In general, a lithographic printing plate is composed of an oleophilic image portion receiving an ink and a hydrophilic non-image portion receiving wetting water in the printing process. As the lithographic printing plate, a photosensitive (PS) plate composed of a hydrophilic support having thereon an oleophilic photosensitive resin layer has been widely used. In the prepress process using the same, generally, exposure is conducted through an original copy, such as a lith film, and a non-image portion is removed by dissolving with a developing solution, whereby a desired printing plate is obtained.

While such an operation is necessary after exposure that the non-image portion is removed by dissolving in the conventional prepress process using the PS plate, it is one of the problems of the conventional technique demanding to be solved that such an additional wet process is omitted (i.e., replaced by a dry process) or is simplified. Particularly, in recent years, since treatment of waste liquid discharged from the wet process has become a matter of concern to the industrial world, demand for improvement of the process in this respect is being increased.

As one simple prepress process addressing the demand, a process has been proposed that an image recording layer in which removal of a non-image portion of a printing plate original can be conducted through an ordinary printing process is used, and the layer is exposed and then developed on a printing machine, so as to obtain a final printing plate. The prepress process of the lithographic printing plate according to such a process is referred to as an on-machine developing process. Examples of the specific process include the use of an image recording layer that is soluble in wetting water or an ink solvent, and a process conducting mechanical removal by contact with an impression cylinder or a blanket cylinder. However, in the case where a conventional image recording material utilizing an ultraviolet ray or a visible ray is subjected to the on-machine development, because an image recording layer is not fixed even after exposure in such an image recording material, such a complicated operation becomes necessary that, for example, the original plate is stored under a completely light shielding condition or a completely-temperature constant condition until it is loaded on the printing machine.

As another trend in this field of art, a digitalization technique is being widely spread in which image information is electronically processed, accumulated and output provided by using a computer, and various novel image output processes are being subjected to practical use addressing the digitalization technique. According to the trend, a computer-to-plate technique receives an attention in which technique an original plate is exposed by scanning with a radiant ray of high astringency like laser beam carrying digitalized image information, so as to produce a printing plate in a direct manner without using a lith film. Accordingly, it becomes an important technical problem to obtain an original printing plate adapted to such a purpose.

Therefore, demands for simplification, use of a dry process and omission of the process for the prepress operation are being greatly increased from both the standpoints of environment and digitalization.

As a production process of a printing plate of scanning exposure type, which can be easily incorporated in the digitalization technique, a prepress process utilizing a solid laser of high output power, such as a semiconductor laser or a YAG laser, as an image recording means is receiving hopeful attention since the laser is available at low cost. In the conventional prepress process, image recording is conducted in such a manner that imagewise exposure of low or intermediate illuminance is applied to a photosensitive original plate to effect imagewise physical change on the surface of the original plate by a photochemical reaction. In a process using exposure of a high power density by a high output power laser, however, an exposed area is intensively irradiated with a large amount of light energy within a momentary exposure period, so as to effectively convert the light energy to heat energy, and thermal change, such as chemical change, phase change and change in shape and structure, is caused by the heat, so that the change is utilized for image recording. In other words, while the image information is input by light energy, such as laser light, the image recording is effected by a reaction caused by the heat energy. In general, such a recording mode utilizing the heat generation caused by the high power density exposure is referred to as heat mode recording, and the conversion of light energy to heat energy is referred to as photothermal conversion.

A remarkable advantage of the prepress process using the heat mode recording means is that exposure is not effected with an ordinary illuminance level, such as interior illumination, and a fixing operation is not necessary for an image recorded by the high illuminance exposure. In other words, when a heat mode sensitive material is utilized for image recording, it is not exposed by interior illumination, and an image does not have to be fixed after exposure. Therefore, for example, when a prepress process, in which an image recording layer which is made insolubilized or solubilized by the heat mode exposure is used and the exposed image recording layer is imagewise removed to form a printing plate, is conducted by the on-machine developing process, a printing system can be established in which the development (removal of the non-image portion) can be effected so that the image is not adversely affected even when the image is exposed to interior environmental illumination for a certain period after the imagewise exposure.

Therefore, it is expected that a lithographic printing plate original plate that is suitable for the on-machine developing process can be realized by utilizing the heat mode recording.

As one of preferred production processes for a lithographic printing plate based on the heat mode recording, such a process has been proposed that a hydrophobic image recording layer is provided on a hydrophilic substrate, which is subjected to imagewise heat mode exposure to change the solubility and the dispersibility of the hydrophobic layer, followed by removing, depending on necessity, the non-image portion by wet development.

Examples of the original plate of this type include a process for obtaining a printing plate in JP-B-46-27919, in which an original plate is subjected to heat mode recording, the original plate being composed of a hydrophilic support having thereon a recording layer exhibiting the so-called positive effect (where the solubility is increased by heat) a recording layer specifically having a particular composition containing a saccharide and a melamine formaldehyde resin.

However, since the recording layer thus disclosed has insufficient heat sensitivity, the sensitivity to the heat mode scanning exposure is insufficient. Furthermore, it is a practical problem that the discrimination between hydrophobicity and hydrophilicity before and after exposure, i.e., the change in solubility, is small. When the discrimination is poor, it is practically difficult to conduct prepress by the on-machine developing process.

WO98/40212 discloses a lithographic printing plate original that can be subjected to prepress without development, composed of a hydrophilic layer containing a transition metal oxide colloid formed on a substrate having an ink receiving layer containing a photothermal conversion agent coated thereon. In this original plate, the hydrophilic layer containing the transition metal oxide colloid is removed by ablation (scattering) by heat generated by the photothermal conversion agent at the exposed part. However, since the photothermal conversion agent is present on the side of the substrate, the heat converted from the absorbed light is dissipated toward the substrate, and thus the heat cannot be effectively utilized for the ablation of the hydrophilic layer, so as to cause a problem of low sensitivity. While JP-A-55-105560 and WO94/18005 disclose lithographic printing plate originals similar to the foregoing, each of which is composed of a hydrophilic layer that can be subjected to ablation provided on a substrate having a oleophilic photothermal conversion layer coated thereon, they have low sensitivity because of the similar reasons.

In order to avoid the drawback (i.e., the low density) of the heat-sensitive lithographic printing plate original which is subjected to ablation, WO99/19143 and WO99/19144 disclose lithographic printing plate originals having a hydrophilic layer containing colloid as an upper layer having a photothermal conversion agent added thereto. In this case, while the sensitivity is increased by the constitution, the addition of the photothermal conversion agent to the hydrophilic layer causes problems that the film quality of the hydrophilic layer is deteriorated to lower the printing durability, and in some cases, the hydrophilicity of the hydrophilic layer is impaired to contaminate a non-image portion with ink during printing.

Furthermore, in the conventional heat-sensitive lithographic printing plate original, because a laser exposure device and a light source are contaminated by the ablation (scattering) of the hydrophilic layer, a device for scavenging ablation dusts is necessary for these devices. However, it is difficult to sufficiently remove the contamination even though the scavenging device is provided.

Consequently, the prepress process and the printing process utilizing the heat mode image recording have an advantage that they can directly produce a press plate from an original copy without using a film, and thus the on-machine prepress can be conducted to omit the developing operation, but they also have the foregoing drawbacks.

On the other hand, as a simple process of lithographic printing using no wetting water, lithographic printing using an emulsion ink has been proposed in JP-B-49-26844, JP-B-49-27124, JP-B-49-27125, JP-A-53-36307, JP-A-53-36308, JP-B-61-52867, JP-A-58-2114844, JP-A-53-27803, JP-A-53-29807, JP-A-54-146110, JP-A-57-212274, JP-A-58-37069 and JP-A-54-106305. The emulsion ink is an emulsion of a water-containing ink, and since water and the ink is separated on the surface of a plate, it has such characteristics that water can be supplied from the ink, and therefore, no wetting water has to be supplied from the printing machine.

However, in the case where the emulsion ink is applied to the conventional lithographic printing plate having a non-image portion on the surface of an aluminum substrate having been made hydrophilic, there are problems in which water degradation is caused by excessive water, and background contamination is caused by shortage of water. As the quantitative balance between the ink and water supplied from the emulsion ink is constant, but the proportion of the non-image portion, to which water is supplied, and an image portion, to which the ink is supplied, greatly varies depending on printed matters to be produced, the latitude of a balance between the ink and water on the plate is small.

SUMMARY OF THE INVENTION

The present invention has been developed to solve the foregoing problem associated with the conventional heat mode prepress process using laser exposure and the foregoing problem associated with the case where an emulsion ink is applied.

That is, a first object of the invention is to provide a lithographic printing process in which printing is conducted without using wetting water by using a heat-sensitive lithographic printing plate original that can be subjected to prepress by a simple on-machine process, so as to provide stable printed matter without contamination on a non-image portion or dropout on an image portion.

A second object of the present invention is to provide a lithographic printing process conducting printing without the use of wetting water by applying an emulsion ink, in which a printed matter of stable high quality can be easily obtained irrespective of the balance between an image portion and a non-image portion.

A third object of the invention is to provide a lithographic printing process using an emulsion ink, in which a novel hydrophilic layer that can suitably address supply of water from an emulsion ink is utilized as a non-image portion.

As a result of extensive investigations made by the inventors, it has been found that scattering of ablation dusts of a heat-sensitive layer and a hydrophilic layer can be prevented without deterioration in printing suitability and sensitivity by providing an overcoat layer, and the removal of the overcoat layer and the hydrophilic layer on the printing plate can be effectively conducted by using an emulsion ink as the ink, so as to accomplish the first object of the invention.

That is, in a first characteristic feature of the lithographic printing process according to the invention, image recording is conducted on a heat-sensitive lithographic printing plate original having an overcoat layer that can be removed upon printing, and then printing is conducted by using an emulsion ink.

In a preferred embodiment of the invention, the heat-sensitive lithographic printing plate original comprises a heat-sensitive layer having an ink receiving surface, a hydrophilic layer and the overcoat layer provided on the heat-sensitive layer in this order, and in the process for forming an image, the adhesiveness between the heat-sensitive layer and the hydrophilic layer is decreased in the heated region by a thermal action applied on a surface of the heat-sensitive layer to enable removal of the hydrophilic layer, so as to effect image recording, and thereafter, in the process for printing, the emulsion ink is supplied to the plate surface, so as to remove the overcoat layer and the heated region of the hydrophilic layer by a hydrophilic component of the ink.

It is preferred at this time that the overcoat layer contains a photothermal conversion agent, which converts laser light to heat, from the standpoint of improvement in sensitivity and image formation property.

According to the first characteristic feature of the invention, since an overcoat layer that can be removed upon printing, i.e., is hydrophilic, is the uppermost layer of the lithographic printing plate original, scattering due to ablation of a heat-sensitive layer and a hydrophilic layer caused by exposure or heating can be prevented, and furthermore, the hydrophilic overcoat layer is easily removed by conducting printing using an emulsion ink containing a hydrophilic component, whereby the printing suitability, such as printing durability and contamination resistance, and the sensitivity are not impaired.

In the printing process according to the invention, heating on forming an image is preferably effected by exposure with laser light, such as an infrared laser.

In the case where the overcoat layer is transparent to the exposure wavelength for image formation, the layer does not influence the sensitivity, and in the case the layer contains a photothermal conversion agent having absorbance at the exposure wavelength, it contributes to improving the sensitivity.

As a result of extensive investigations made by the inventors, it has been found that a lithographic printing plate having, on a non-image portion, a hydrophilic layer having an inorganic matrix formed by sol-gel conversion can be used, so as to solve the foregoing problems, whereby the second and third objects of the invention have been accomplished.

That is, in the second characteristic feature of the invention, image recording is effected on a lithographic printing plate original to form a non-image portion formed with a hydrophilic layer having an inorganic matrix formed by sol-gel conversion, and thereafter, printing is conducted by using an emulsion ink which is obtained by adding a hydrophilic component mainly comprising water and/or a polyhydric alcohol to an oleophilic ink component and emulsifying the mixture.

In this characteristic feature of the invention, the lithographic printing plate original used for the lithographic printing process preferably comprises a support having thereon a hydrophilic layer having an inorganic matrix formed by sol-gel conversion.

According to this characteristic feature of the invention, a non-image portion is formed with the hydrophilic layer having the inorganic matrix formed by sol-gel conversion that has a function suitable for conducting printing by using an emulsion ink, whereby printed matter of high quality can be stably provided.

It is not completely clear why the hydrophilic layer having the inorganic matrix formed by sol-gel conversion effectively functions in printing using an emulsion ink. It is considered as one factor that since the hydrophilic layer having the inorganic matrix formed by sol-gel conversion is hydrophilic and simultaneously has some organic groups in comparison to the conventional aluminum substrate surface, it has higher affinity to the polyhydric alcohol component contained in the hydrophilic component in the emulsion ink, and thus sufficient ink repellance can be obtained even in the case where the amount of the hydrophilic component present on the plate surface is small. It is also considered as another factor that since the hydrophilic layer having the inorganic matrix formed by sol-gel conversion is a porous film, the hydrophilic components in the emulsion ink can be effectively retained inside the layer even when the amount of the hydrophilic component present on the plate surface is excessive, whereby the latitude of the balance between the amount of an oleophilic ink component and a hydrophilic component on the plate surface is large.

DESCRIPTION OF THE PREFERRED EMBODIMENTS

First Embodiment

A first embodiment of the invention will be described in more detail below.

The heat-sensitive lithographic printing plate original applied in the printing process of this embodiment has such a characteristic feature that it comprises an overcoat layer that can be removed in printing, and the overcoat layer is easily removed by an emulsion ink used in printing.

Emulsion Ink

The emulsion ink used in this embodiment is an emulsion ink formed by adding and emulsifying a hydrophilic component in an oleophilic ink component, and may be either a W/O (water in oil) type or an O/W (oil in water) type. The emulsion ink used in this embodiment maintains a stable emulsion state under the storage condition in an ink canister and in an ink container upon application to printing, and when the ink is transferred through an inking system (ink supplying system) upon printing under application of a shearing force to reach an ink supplying roller, the emulsion state is broken to separate the hydrophilic component to be supplied to the plate surface. On the plate surface, the hydrophilic component is attached to the non-image region to form a liquid film to prevent attachment of the oleophilic ink component, and the oleophilic ink component is attached to the image portion. The emulsion ink can be used in this embodiment without particular limitation, as long as it has the foregoing function.

In order to exhibit the foregoing function by the emulsion ink used in this embodiment, it is preferred to use a printing machine having an inking system equipped with a cooling mechanism.

The ratio of the oleophilic ink component and the hydrophilic component in the emulsion ink of this embodiment is that the amount of the hydrophilic component is from 5 to 150 parts by weight, and preferably from 20 to 100 parts by weight, per 100 parts by weight of the oleophilic ink component.

As the oleophilic ink component of the emulsion ink of this embodiment, an ordinary oleophilic ink can be used, which includes, for example, a vegetable oil, a synthetic resin varnish, a natural resin varnish, a synthetic varnish thereof, a high boiling point petroleum solvent, a pigment and other additives (such as an abrasion resistance improving agent, an ink dryer and a drying suppressing agent).

As the hydrophilic component of the emulsion ink of this embodiment, water and/or a polyhydric alcohol can be used.

Examples of the polyhydric alcohol include glycerin, diglycerin, ethylene glycol, diethylene glycol, propylene glycol, dipropylene glycol, hexylene glycol, sorbitol, butanediol and pentanediol. Among these, glycerin, ethylene glycol, diethylene glycol, propylene glycol and dipropylene glycol are preferably used.

The polyhydric alcohol may be used singly or in a combination of two or more, and may be used as a mixture with water.

In the hydrophilic component in this embodiment, the content of the polyhydric alcohol is preferably from 30 to 100% by weight, and more preferably from 50 to 100% by weight.

In the hydrophilic component of the emulsion ink in this embodiment, an additive may be used in addition to the foregoing for improvement of emulsion stability, improvement of flow characteristics, improvement of hydrophilicity and suppression of evaporation of the hydrophilic component.

Examples of the additive include a monovalent alcohol, such as methanol and ethanol, an aminoalcohol, such as monoethanolamine and diethanolamine, a known surface active agent, such as a nonionic series, an anionic series, a cationic series and a betaine series, an oxycarboxylic acid, such as glycolic acid, lactic acid and citric acid, a hydrophilic polymer, such as polyvinylpyrrolidone, polyacrylic acid, gum arabic and carboxymethyl cellulose, and an inorganic or organic salt, such as a phosphate, silicate, nitrate and a salt thereof.

Examples of the thermal action for conducting image recording include direct thermal energy itself by, for example, a thermal recording head, and those by thermal energy obtained by converting light, such as an infrared laser, to heat with a photothermal conversion agent.

Heat-sensitive Original Plate for Lithographic Printing Plate

A heat sensitive lithographic printing plate original that can be used in this embodiment is a heat-sensitive lithographic printing plate having an overcoat layer as the uppermost layer that can be removed upon printing and can be subjected to image recording with a thermal action. The fact that it can be subjected to image recording with a thermal action herein means that it has a heat-sensitive layer that can be chemically and/or physically changed by the action of heat, and it involves, for example, a heat-sensitive lithographic printing plate original having such a heat-sensitive layer that enables image recording by utilizing decrease or increase of an interface adhesion property to the adjacent layer by thermal fusion, thermal decomposition or thermal crosslinking of the heat-sensitive layer, decrease or increase of the solubility of the heat-sensitive layer itself, or polarity change or phase change of the heat-sensitive layer.

Among these, a lithographic printing plate original that enables image recording by decrease of the interface adhesion property to the layer adjacent to the heat-sensitive layer by chemical and/or physical change can be preferably used.

Specific examples thereof include an embodiment of a heat-sensitive lithographic printing plate original comprising a heat-sensitive layer having an ink receiving surface having thereon a hydrophilic layer and an overcoat layer in this order. In this embodiment, the surface of the heat-sensitive layer receives the thermal function at a heated part to decrease the adhesion to the hydrophilic layer, whereby removal of the hydrophilic layer at that part becomes possible. Therefore, in the case where this embodiment of the heat-sensitive lithographic printing plate original is applied to printing by using the emulsion ink after image recording, the hydrophilic layer at the heated part can be easily removed along with the overcoat layer on the printing machine, so as to enable printing.

While an embodiment of a heat-sensitive lithographic printing plate original comprising a heat-sensitive layer having an ink receiving surface having thereon a hydrophilic layer and an overcoat layer in this order will be described in more detail below, the present invention is not construed as being limited to this embodiment.

Overcoat Layer

The overcoat layer used in this embodiment is a layer that is easily removed by supplying an emulsion ink to the plate surface upon printing, and that has a function of protecting the hydrophilicity of the surface of the hydrophilic layer, and it preferably contains a polymer compound capable of forming a film. The function that it is removed with the emulsion ink includes a case of forming a hydrophilic film that is removed by the hydrophilic component contained in the ink and a case of forming an oleophilic film that is removed by the ink component, and it is preferred to form the hydrophilic film from the standpoint of easiness of removal as described in detail below.

The overcoat layer of this embodiment can be provided in the following manner. A coating solution containing the polymer compound can be coated and dried directly on the hydrophilic layer, or in alternative, the coating solution is coated and dried on a separate support, and then it is provided on the hydrophilic layer by lamination, followed by releasing and removing the support.

The polymer used in the overcoat layer of this embodiment may be a known organic or inorganic resin. It is preferably one having a film forming function capable of forming a film, and in order for easy removal upon printing with the emulsion ink, it is preferably easily dissolved or dispersed in the hydrophilic component of the emulsion ink, particularly water and/or a polyhydric alcohol. A hydrophilic polymer is preferred as the polymer, and specific examples thereof include polyvinyl acetate (provided that it has a hydrolysis degree of 65% or more), polyacrylic acid and an alkali metal salt or an amine salt thereof, a polyacrylic acid copolymer and an alkali metal salt or an amine salt thereof, polymethacrylic acid and an alkali metal salt or an amine salt thereof, a polymethacrylic acid copolymer and an alkali metal salt or an amine salt thereof, polyacrylamide and a copolymer thereof, polyhydroxyethylene acrylate, polyvinyl pyrrolidone and a copolymer thereof, polyvinyl methyl ether, a polyvinyl methyl ether-maleic anhydride copolymer, poly-2-acrylamide-2-methyl-1-propanesulfonic acid and an alkali metal salt or an amine salt thereof, a poly-2-acrylamide-2-methyl-1-propanesulfonic acid copolymer and an alkali metal salt or an amine salt thereof, gum arabic, a cellulose derivative (such as carboxymethyl cellulose, carboxyethyl cellulose and methyl cellulose) and a modified product thereof, white dextrin, pullulan and enzyme decomposition etherified dextrin. These resins may be used by mixing two or more thereof depending on purpose.

In the case where image recording of the heat-sensitive lithographic printing plate original in this embodiment is conducted by using laser light, the overcoat layer preferably has a photothermal conversion function and preferably contains a photothermal conversion substance in addition to the foregoing polymer from the standpoint of improvement of the sensitivity. The photothermal conversion substance used in the overcoat layer in this embodiment is not particularly limited as long as it has such a function that it absorbs light having the wavelength used for exposure, i.e., light having a wavelength of 700 nm or more in the case of an infrared laser, to generate heat, and various known pigments and dyes can be used. In order for easy removal thereof upon printing with the emulsion ink as similar to the polymer, it is preferred that the substance is easily dissolved or dispersed in the hydrophilic component of the emulsion ink, particularly water and/or a polyhydric alcohol.

As the pigment, commercially available pigments and the pigments disclosed in the Color Index (C.I.) Reference, "Saishin Ganryo Binran (Newest Pigment Handbook)" (edited by Society of Pigment Engineering Japan, 1977), "Saishin Ganryo Oyo Gijutu (Newest Pigment Application Technique)" (published by CMC Publications, 1986), "Insatu Ink Gijutu (Printing Ink Technique)" (published by CMC Publications, 1984) can be used.

Examples of species of the pigment include a black pigment, a brown pigment, a red pigment, a violet pigment, a blue pigment, a green pigment, a fluorescent pigment, a metallic powder pigment and a polymer binding pigment. Specific examples thereof include an insoluble azo pigment, an azo lake pigment, a condensation azo pigment, a chelate azo pigment, a phthalocyanine series pigment, an anthraquinone series pigment, a perylene and perynone series pigment, a thioindigo series pigment, a quinacridone series pigment, a dioxane series pigment, an isoindolinone series pigment, a quinophthalone series pigment, a dyeing lake pigment, an azine pigment, a nitroso pigment, a nitro pigment, a natural pigment, a fluorescent pigment, an inorganic pigment and carbon black.

The pigments may be used without conducting a surface treatment or may be used after conducting a surface treatment. It is considered that examples of the method for conducting surface treatment include a method of surface coating a hydrophilic resin or an oleophilic resin, a method of attaching a surface active agent, a method of bonding a reactive substance (such as silica gel, alumina sol, a silane coupling agent, an epoxy compound and an isocyanate compound) on the surface of the pigment. The methods for the surface treatment are disclosed in "Kinzoku Sekken no Seisitsu to Oyo (Nature and Application of Metallic Soap)" (published by Saiwai Shobo), "Insatsu Ink Gijutu (Printing Ink Technique)" (published by CMC Publishing, 1984) and "Saishin Ganryo Oyo Gijutu (Newest Pigment Application Technique)" (published by CMC Publications, 1986). Among the pigments, those absorbing infrared light or near infrared light are preferred from the standpoint that they are suitable for the use of a laser emitting infrared light or near infrared light.

Preferred examples of the pigment that absorbs infrared light or near infrared light include carbon black, carbon black coated with a hydrophilic resin and carbon black modified with silica sol. Among these, carbon black having a surface coated with a hydrophilic resin or silica sol is useful since it is easily dispersed with a water soluble resin and does not impair the hydrophilicity.

The particle diameter of the pigment is preferably in the range of from 0.01 to 1 μm, and more preferably in the range of from 0.01 to 0.5 μm. A known dispersion technique used for production of an ink and production of a toner can be used as a method of dispersing the pigment. Examples of the disperser include an ultrasonic disperser, a sand mill, an Attritor, a Perl mill, a super mill, a ball mill, an impeller, a Disperser, a KD mill, a colloid mill, a Dynatron, a three-roll mill and a pressure kneader. These dispersers are described in detail in "Saishin Ganryo Oyo Gijutu (Newest Pigment Application Technique)" (published by CMC Publications, 1986).

As the dye, commercially available dyes and those disclosed in the literatures (such as "Senryo Binran (Dye Handbook)" edited by Association of Organic Synthetic Chemistry, 1970) can be used. Specific examples thereof include an azo dye, a metallic complex salt azo dye, a pyrazolone azo dye, an anthraquinone dye, a phthalocyanine dye, a carbonium dye, a quinoneimine dye, a methine dye and a cyanine dye. Among the dyes, those absorbing infrared light or near infrared light are preferred from the standpoint that they are suitable for the use of a laser emitting infrared light or near infrared light.

Examples of the dye absorbing infrared light or near infrared light include cyanine dyes disclosed in JP-A-58-125246, JP-A-59-84356, JP-A-59-202829 and JP-A-60-78787, methine dyes disclosed in JP-A-58-173696, JP-A-58-181690 and JP-A-58-194595, naphthoquinone dyes disclosed in JP-A-58-112793, JP-A-58-224793, JP-A-59-48187, JP-A-59-73996, JP-A-60-52940 and JP-A-60-63744, a squarylium dye disclosed in JP-A-58-112792, a cyanine dye disclosed in British Patent No. 434,875, and the dyes disclosed as formulae (I) and (II) below in U.S. Pat. No. 4,756,993:

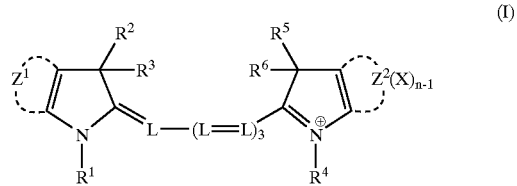

(I)

wherein $R^1$, $R^2$, $R^3$, $R^4$, $R^5$ and $R^6$ each represents a substituted or unsubstituted alkyl group; $Z^1$ and $Z^2$ each represents a substituted or unsubstituted phenyl group or a substituted or unsubstituted naphthalene group; L represents a substituted or unsubstituted methine group, wherein when the methine group has a substituent, the substituent may be an alkyl group having 8 or less carbon atoms, a halogen atom or an amino group, or in alternative the methine group may include a cyclohexane ring or a cyclopentane group which may have a substituent group formed by combining substituents on the two methine carbon atoms of the methine group, and the substituent group may be an alkyl group having 6 or less carbon atoms or a halogen atom; X represents an anionic group; and n represents an integer of 1 or 2, provided that at least one of $R^1$, $R^2$, $R^3$, $R^4$, $R^5$, $R^6$, $Z^1$ and $Z^2$ represents an alkali metallic salt group or an amine salt group of an acidic group or a basic group,

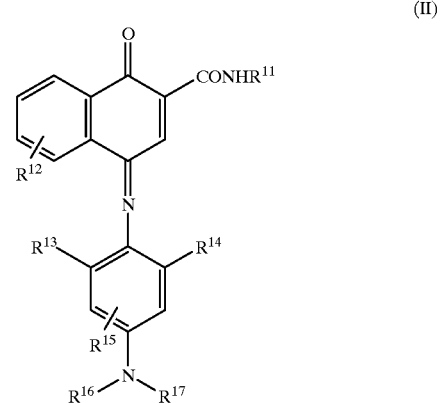

(II)

wherein $R^{11}$ represents a substituted or unsubstituted alkyl group, a substituted or unsubstituted aryl group or a substituted or unsubstituted heterocyclic group; $R^{12}$ and $R^{15}$ each represents a hydrogen atom or a group that can be substituted instead of a hydrogen atom; $R^{13}$ and $R^{14}$ each represents a hydrogen atom, a halogen atom, a substituted or unsubstituted alkoxy group or a substituted or unsubstituted alkyl group, provided that both $R^{13}$ and $R^{14}$ do not simultaneously represent hydrogen atoms; and $R^{16}$ and $R^{17}$ each represents a substituted or unsubstituted alkyl group, a substituted or unsubstituted aryl group; an acyl group or a sulfonyl group, provided that $R^{16}$ and $R^{17}$ may be combined to form a 5-membered or 6-membered ring.

The infrared absorption sensitizing agent disclosed in U.S. Pat. No. 5,156,938 is preferably used as the dye, and a substituted arylbenzo(thio)pyrylium salt disclosed in U.S. Pat. No. 3,881,924, a trimethinethiapyrylium salt disclosed in JP-A-57-142645 (corresponding to U.S. Pat. No. 4,327,169), pyrylium series compounds disclosed in JP-A-58-181051, JP-A-58-220143, JP-A-59-41363, JP-A-59-84248, JP-A-59-84249, JP-A-59-146063 and JP-A-59-146061, a cyanine dye disclosed in JP-A-59-216146, a pentamethinethiopyrylium salt disclosed in U.S. Pat. No. 4,283,475, a pyrylium compound disclosed in JP-B-5-13514 and JP-B-5-19702, and EPOLIGHT III-178, EPOLIGHT III-130 and EPOLIGHT III-125 produced by Epolin, Inc. are particularly preferably used. Among these dyes, the water soluble cyanine dye represented by the general formula (I) is especially preferred.

Specific examples of the compound, Example Compounds (I-1) to (I-32), will be listed below, but the present invention is not construed as being limited thereto.

(I-1)–(I-32)

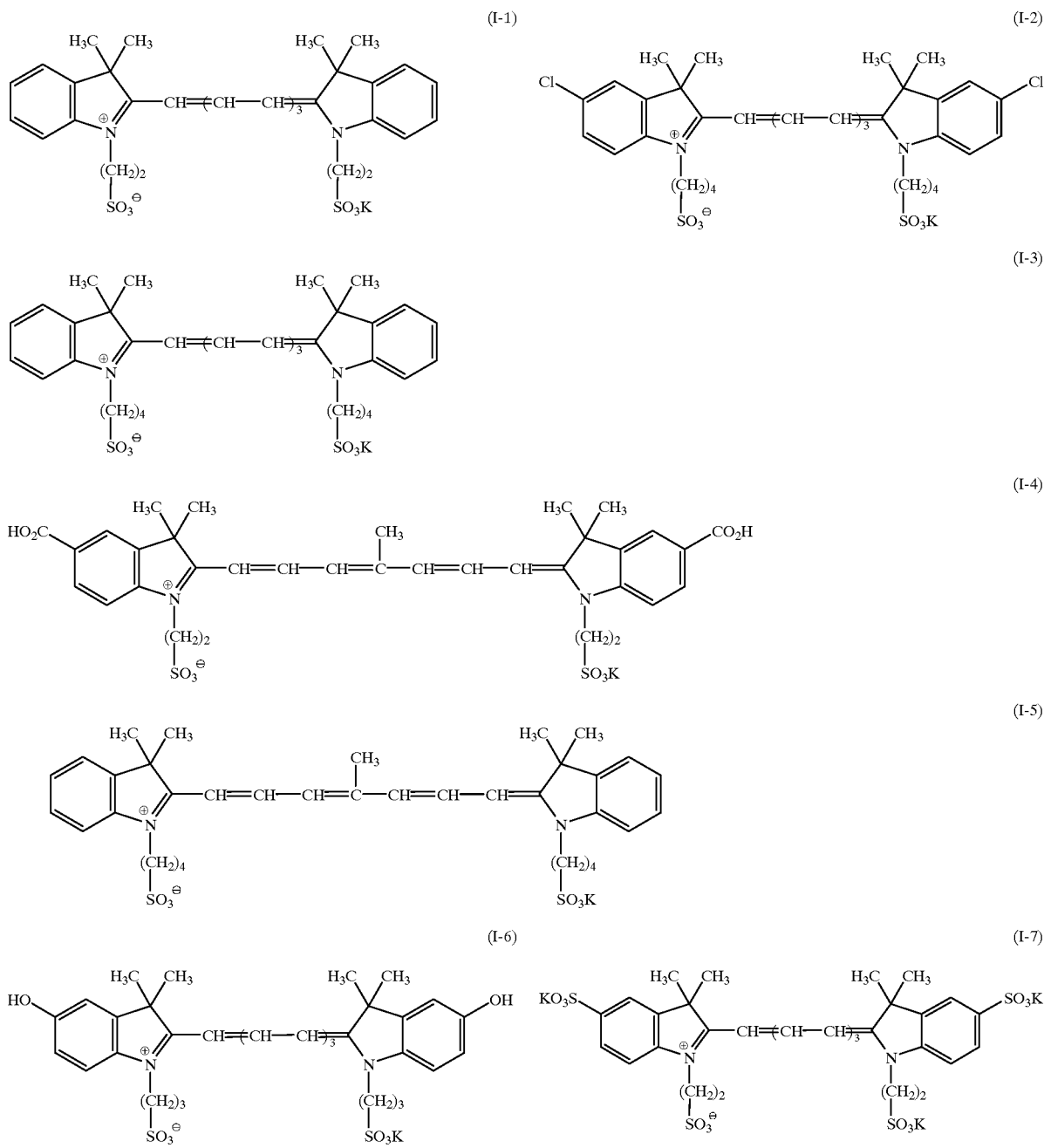

-continued
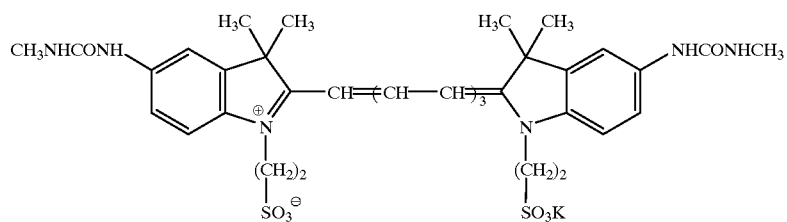
(I-8)
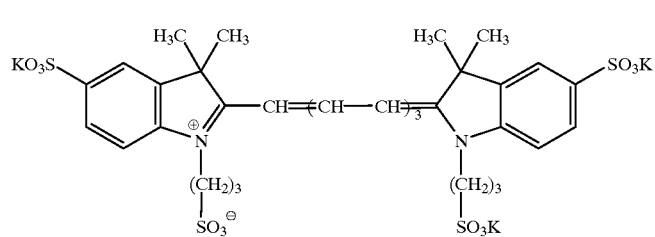
(I-9)
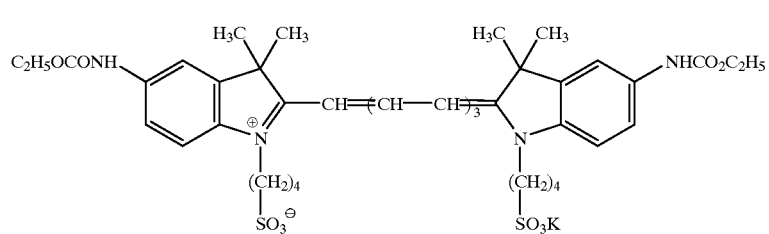
(I-10)
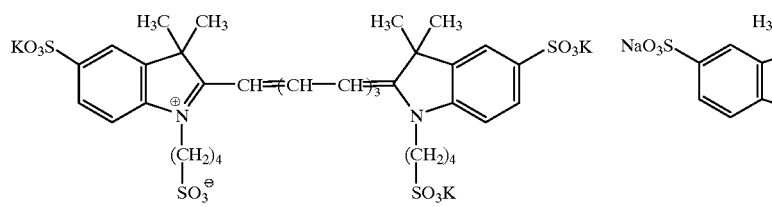
(I-11) (I-12)
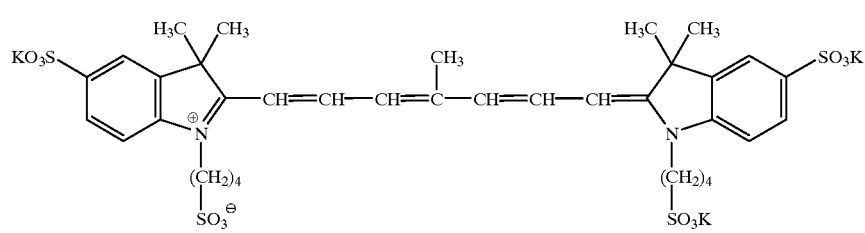
(I-13)
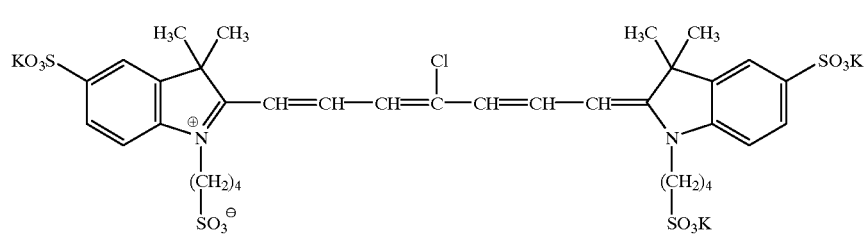
(I-14)

-continued
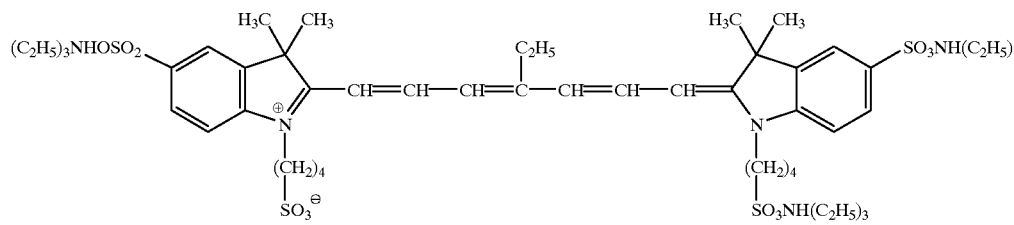
(I-15)
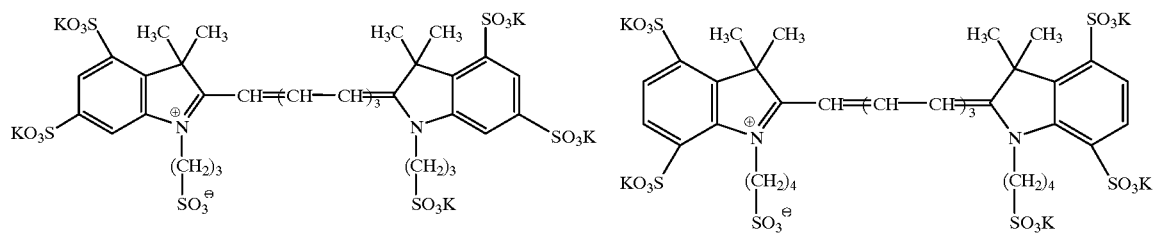
(I-16)
(I-17)
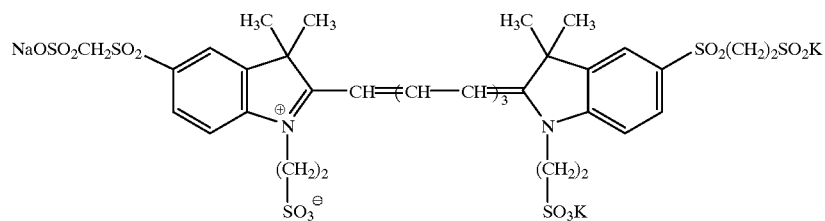
(I-18)
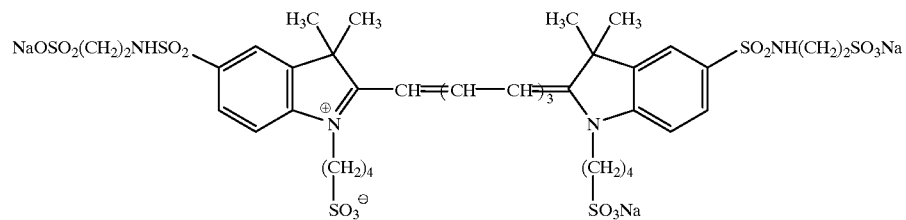
(I-19)
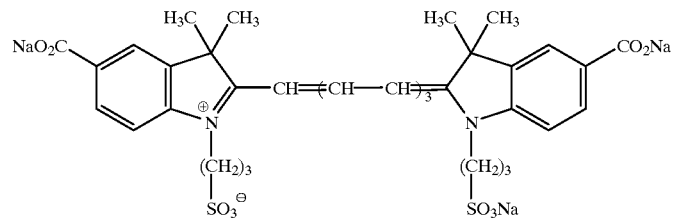
(I-20)
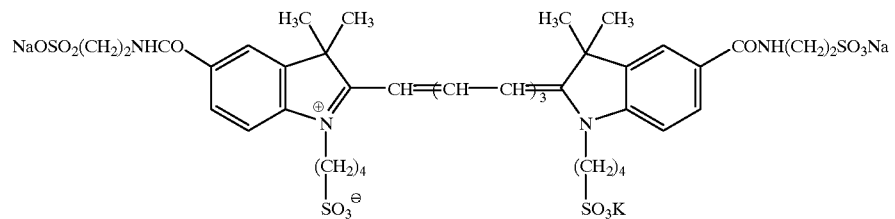
(I-21)

-continued
(I-22)
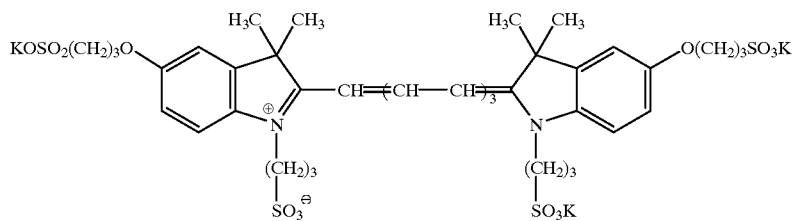
(I-23) (I-24)
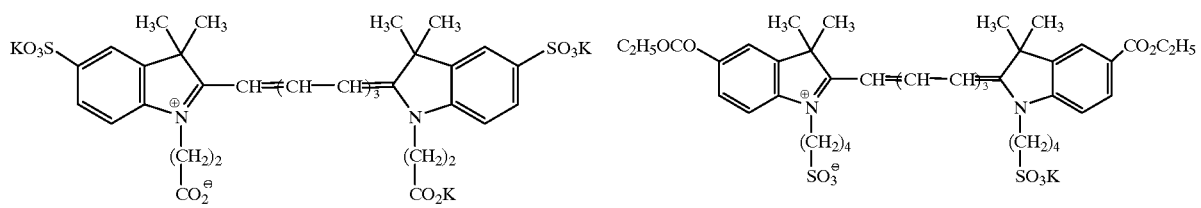
(I-25) (I-26)
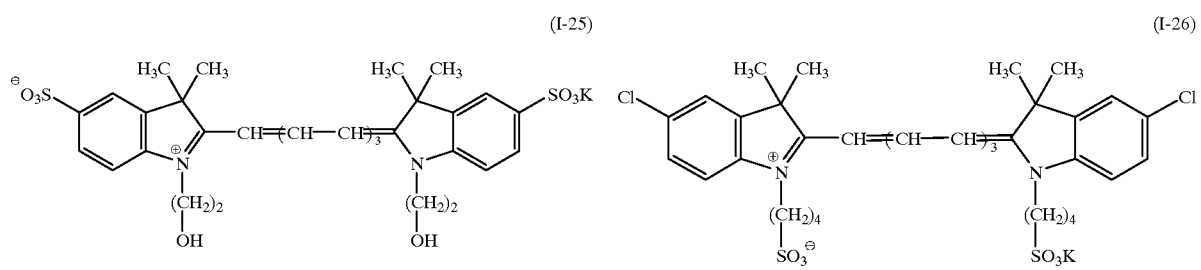
(I-27)
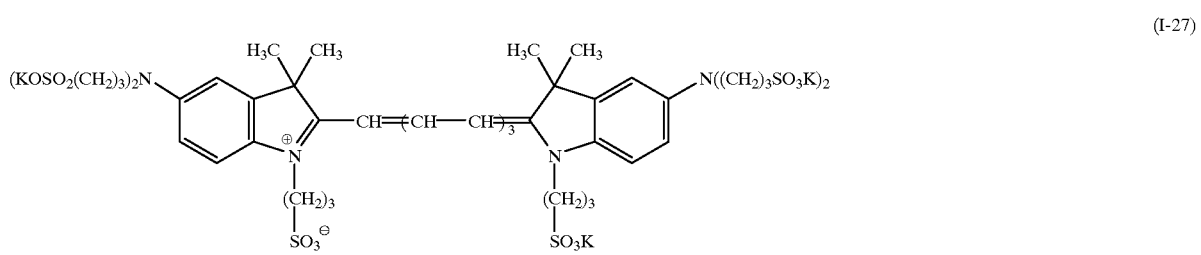
(I-28)
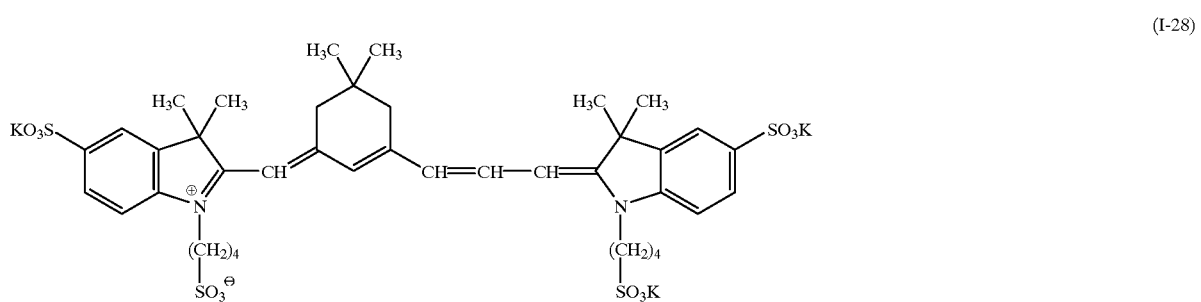
(I-29)
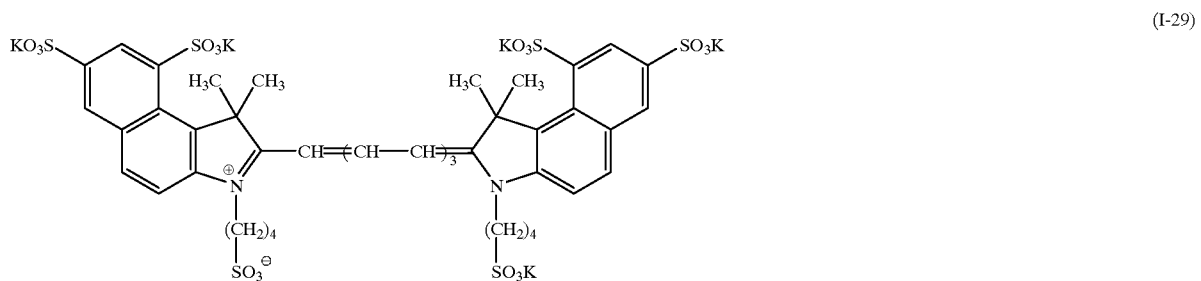

-continued

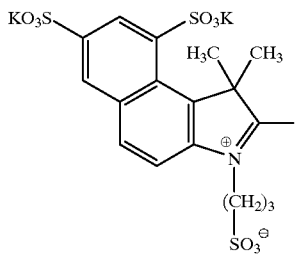
(I-30)

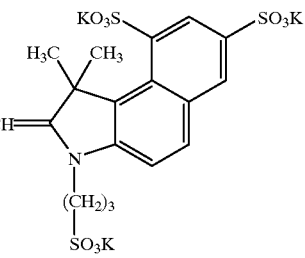

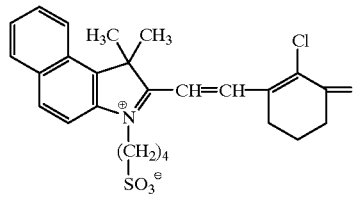
(I-31)

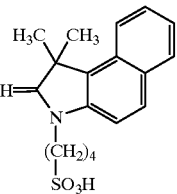
(I-32)

The amount of the pigment or the dye is from 1 to 70% by weight, and preferably from 2 to 50% by weight, based on the total solid content of the overcoat layer. In the case of the dye, the amount is particularly preferably from 2 to 30% by weight, and in the case of the pigment, it is particularly preferably from 20 to 50% by weight. If the addition amount of the pigment or the dye is less than the range, the sensitivity is lowered, and if it exceeds the range, the uniformity of the layer is lost, to deteriorate the durability of the layer.

In the overcoat layer, a plasticizer, a pigment, a dye, a surface active agent, particles and an adhesion improving agent, for example, maybe added for improvement of the physical strength of the film, improvement of the dispersibility of the compositions constituting the film, improvement of the coating property, improvement of the removing property of the film and improvement of adhesion property to the surface of the heat-sensitive lithographic printing plate original.

For example, in the case where the overcoat layer is provided by coating an aqueous solution, a nonionic surface active agent is mainly added to improve uniformity of coating. Specific examples of the nonionic surface active agent include sorbitan tristearate, sorbitan monopalmitate, sorbitan trioleate, stearic monoglyceride and polyoxyethylene nonyl phenyl ether.

The amount of the nonionic surface active agent is preferably from 0.05 to 5% by weight, and more preferably from 1 to 3% by weight, based on the total solid content of the overcoat layer.

If thickness of the overcoat layer used in this embodiment is preferably from 0.05 to 4.0 μm, and more preferably from 0.1 to 1.0 μm.

If the overcoat layer is too thick, the period of time required for removing on the machine upon printing is prolonged, and there is a possibility that a large amount of the component of the overcoat layer dissolved exhibits adverse affect. If it is too thin, there are cases where the film property is impaired. In the case where the overcoat layer contains the photothermal conversion substance, there is a tendency that the heating efficiency of the lithographic printing plate original is lowered if it is too thick or too thin depending on the content of the substance.

Hydrophilic Layer

The hydrophilic layer that can be used in this embodiment is such a layer that adhesion to the heat-sensitive layer is lowered corresponding to chemical and/or physical change of the lower layer due to heat from the surface of the heat-sensitive layer, and also such a layer that receives and retains the hydrophilic component of the emulsion ink upon printing, so as to function as the non-image portion.

Preferred examples of the hydrophilic layer of this embodiment include an organic hydrophilic matrix obtained by crosslinking or quasi-crosslinking an organic hydrophilic polymer, an inorganic hydrophilic matrix obtained by sol-gel conversion by hydrolysis and a condensation reaction of polyalkoxysilane, titanate, zirconate or aluminate, and a thin film of a metal or a metallic compound having a hydrophilic surface.

Examples of the crosslinking reaction used for forming the organic hydrophilic matrix of the hydrophilic layer of this embodiment include formation of a covalent bond by heat or light and formation of an ionic bond by a polyvalent metallic salt.

As the organic hydrophilic polymer used in this embodiment, a polymer having a functional group that can be used for the crosslinking reaction is preferred.

Preferred examples of the functional group include —OH, —SH, —NH$_2$, —NH—, —CO—NH$_2$—, —CO—NH—, —O—CO—NH—, —NH—CO—NH—, —CO—OH, —CO—O—, —CO—O—, —CS—OH, —CO—SH, —CS—SH, —SO$_3$H, —SO$_2$(O$^-$), —PO$_3$H$_2$, —PO(O$^-$)$_2$, —SO$_2$—NH$_2$, —SO$_2$—NH—, —CH=CH$_2$, —CH=CH—, —CO—C(CH$_3$)=CH$_2$, —CO—CH=CH$_2$, —CO—CH$_2$—CO—, —CO—O—CO—, —CH—CH$_2$, and the functional groups having the following structures, and among these, a hydroxyl group, an amino group, a carboxyl group and an epoxy group are preferred.

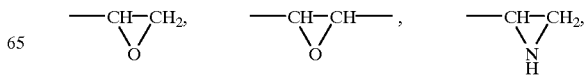

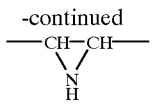

As the organic hydrophilic polymer of this embodiment, a known water soluble binder can be used, and examples thereof include polyvinyl alcohol (polyvinyl acetate having a saponification degree of 60% or more), modified polyvinyl alcohol, such as carboxyl-modified polyvinyl alcohol, starch and a derivative thereof, a cellulose derivative, such as carboxymethyl cellulose, a salt thereof and hydroxyethyl cellulose, casein, gelatin, gumarabic, polyvinyl pyrrolidone, polyvinyl sulfonic acid and a salt thereof, polyhydroxyethyl methacrylate, polyhydroxymethyl acrylate, polyacrylamide, a vinyl acetate-crotonic acid copolymer and a salt thereof, a styrene-maleic acid copolymer and a salt thereof, polyacrylic acid and a salt thereof, polymethacrylic acid and a salt thereof, polyethylene glycol, polyethyleneimine, polyvinyl sulfonic acid and a salt thereof, polystyrene sulfonic acid and a salt thereof, poly(methacryloyloxypropanesulfonic acid) and a salt thereof, polyvinyl sulfonic acid and a salt thereof, poly(methacryloyloxyethyltrimethylammoniumchloride), polyhydroxyethyl methacrylate, polyhydroxyethyl acrylate and polyacrylamide.

These polymers may be a copolymer as long as the hydrophilicity thereof is not impaired, and may be used singly or in a combination of two or more. The amount used thereof is from 20 to 99% by weight, preferably from 25 to 95% by weight, and more preferably from 30 to 90% by weight, based on the total solid content of the hydrophilic layer.

In this embodiment, crosslinking of the organic hydrophilic polymer can be conducted with a crosslinking agent. Examples of known crosslinking agents include a polyfunctional isocyanate compound, a polyfunctional epoxy compound, a polyfunctional amine compound, a polyol compound, a polyfunctional carboxyl compound, an aldehyde compound, a polyfunctional (meth) acrylic compound, a polyfunctional vinyl compound, a polyfunctional mercapto compound, a polyvalent metallic salt compound, a polyalkoxysilane and a hydrolyzed product thereof, a polyalkoxytitanium compound and a hydrolyzed product thereof, a polyalkoxyaluminum compound and a hydrolyzed product thereof, a polymethylol compound and a polyalkoxymethyl compound, and a known reaction catalyst may be added to accelerate the reaction.

The use amount thereof is from 1 to 50% by weight, preferably from 3 to 40% by weight, and more preferably from 5 to 35% by weight, based on the total solid content of the coating solution for the hydrophilic layer.

A system capable of conducting the sol-gel conversion that can be used for forming the inorganic matrix of the hydrophilic layer of this embodiment is such a polymeric body that bonding groups derived from a polyvalent element form a network structure through oxygen atoms, a polyvalent metal simultaneously has a non-bonded hydroxyl group and an alkoxy group, and all of which are present as resin structures in the mixed manner, which the polymeric body is in a sol state in the stage where the amount of the alkoxy group and the hydroxyl group is large, and the network resin structure becomes firm with the progress of formation of ether bonds. The system also has such a function that a part of the hydroxyl groups is bonded to solid fine particles to modify the solid fine particles, whereby the hydrophilicity is changed. Examples of the polyvalent bonding element having the hydroxyl group and the alkoxy group conducting the sol-gel conversion include aluminum, silicon, titanium and zirconium, any of which may be used in this embodiment. A sol-gel conversion system using a siloxane bond, which is most preferably used therein, will be described below. The sol-gel conversion using aluminum, titanium or zirconium can be effected by replacing the silicon in the following description by the respective elements.

That is, what is particularly preferably used is a system containing a silane compound having at least one silanol group that can effect the sol-gel conversion.

The system using the sol-gel conversion will be described in more detail below. The inorganic hydrophilic matrix formed by the sol-gel conversion is preferably a resin having a siloxane bond and a silanol group, which is formed in such a manner that, when a coating liquid, which is a sol system containing a silane compound having at least one silanol group, is coated, dried and aged, hydrolytic condensation of the silanol group proceeds to form a structure of a siloxane skeleton to advance gelation.

The foregoing organic hydrophilic polymer and the crosslinking agent may be added to the matrix having the gel structure for improvement of the physical properties, such as the film strength and the flexibility, improvement of the coating property and adjustment of the hydrophilicity.

The siloxane resin having the gel structure is represented by the following general formula (I), and the silane compound having at least one silanol group can be obtained by hydrolysis of a silane compound represented by the following general formula (II). The silane compound is not necessarily a partial hydrolysis product of the silane compound of the general formula (II) solely, and in general, the silane compound is formed with an oligomer formed by partial hydrolytic polymerization of the silane compound, or in alternative, a mixed composition of the silane compound and the oligomer.

General Formula (I)

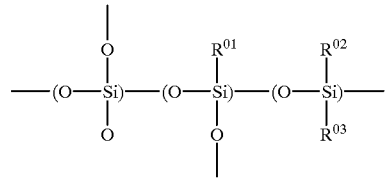

The siloxane-based resin of the general formula (I) is formed by the sol-gel conversion of at least one compound of the silane compound of the general formula (II), and at least one of $R^{01}$ to $R^{03}$ in the general formula (I) represents a hydroxyl group, and the others each represents the organic residual groups for $R^0$ and Y in the general formula (II).

$$(R^0)_n Si(Y)_{4-n}$$ General Formula (II)

In the general formula (II), $R^0$ represents a hydroxyl group, a hydrocarbon group or a heterocyclic group; Y represents a hydrogen atom, a halogen atom (which represents a fluorine atom, a chlorine atom, a bromine atom or an iodine atom), $-OR^1$, $-OCOR^2$ or $-N(R^3)(R^4)$ (in which $R^1$ and $R^2$ each represents a hydrocarbon group, and $R^3$ and $R^4$ each independently represents a hydrogen atom or a hydrocarbon group); and n represents 0, 1, 2 or 3.

Examples of the hydrocarbon group or the heterocyclic group represented by $R^0$ in the general formula (II) include:

(a) a substituted or unsubstituted linear or branched alkyl group having from 1 to 12 carbon atoms (such as a methyl group, an ethyl group, a propyl group, a butyl group, a pentyl group, a hexyl group, a heptyl group, an octyl group, a nonyl group, a decyl group and a dodecyl group, examples of a group substituted on these groups include a halogen atom (such as a chlorine atom, a fluorine atom and a bromine atom), a hydroxyl group, a thiol group, a carboxyl group, a sulfo group, a cyano group, an epoxy group, an —OR' group (wherein R' represents an methyl group, an ethyl group, a propyl group, a butyl group, a heptyl group, a hexyl group, an octyl group, a decyl group, a propenyl group, a butenyl group, a hexenyl group, a octenyl group, a 2-hydroxyethyl group, a 3-chloropropyl group, a 2-cyanoethyl group, N,N-dimethylaminoethyl group, a 1-bromoethyl group, a 2-(2-methoxyethyl)oxyethyl group, a 2-methoxycarbonylethyl group, a 3-carboxypropyl group or a benzyl group), an —OCOR" group (wherein R" represents the same contents as R'), a —COOR" group, a —COR" group, an —N(R'")(R'") group (wherein R'" represents the same contents as R' and the plurality thereof may be the same as each other or different from each other), an —NHCONHR" group, an —NHCOOR" group, an —Si(R")$_3$ group, a —CONHR'" group and an —NHCOR" group, and the plurality of the substituents may be substituted in the alkyl group);

(b) a substituted or unsubstituted linear or branched alkenyl group having from 2 to 12 carbon atoms (such as a vinyl group, a propenyl group, a butenyl group, a pentenyl group, a hexenyl group, an octenyl group, a decenyl group and a dodecenyl group, examples of a group substituted on these groups include the same contents as described for the group substituted on the alkyl group, and the plurality of the substituents may be substituted in the alkyl group);

(c) a substituted or unsubstituted aralkyl group having from 7 to 14 carbon atoms (such as a benzyl group, a phenethyl group, a 3-phenylpropyl group, a naphthylmethyl group and a 2-naphthylethyl group, examples of a group substituted on these groups include the same contents as described for the group substituted on the alkyl group, and the plurality of the substituents may be substituted in the alkyl group);

(d) a substituted or unsubstituted alicyclic group having from 5 to 10 carbon atoms (such as a cyclopentyl group, a cyclohexyl group, a 2-cyclohexylethyl group, a 2-cyclopentylethyl group, a norbornyl group and an adamantane group, examples of a group substituted on these groups include the same contents as described for the group substituted on the alkyl group, and the plurality of the substituents may be substituted in the alkyl group);

(e) a substituted or unsubstituted aryl group having from 6 to 12 carbon atoms (such as a phenyl group and a naphthyl group, examples of a group substituted on these groups include the same contents as described for the group substituted on the alkyl group, and the plurality of the substituents may be substituted in the alkyl group); and (f) a heterocyclic group containing at least one kind of atom selected from a nitrogen atom, an oxygen atom and a sulfur atom, which may be condensed (such as a pyran ring, a furan ring, a thiophene ring, a morpholine ring, a pyrrole ring, a thiazole ring, an oxazole ring, a pyridine ring, a piperidine ring, a pyrrolidone ring, a benzothiazole ring, a benzoxazole ring, a quinoline ring and a tetrahydrofuran ring, which may have a substituent, examples of a group substituted on these groups include the same contents as described for the group substituted on the alkyl group, and the plurality of the substituents may be substituted in the alkyl group).

Examples of the substituent on the groups —OR$^1$, —OCOR$^2$ and —N(R$^3$)(R$^4$) represented by Y in the general formula (II) include the following.

In the group —OR$^1$, R$^1$ represents a substituted or unsubstituted aliphatic group having from 1 to 10 carbon atoms (such as a methyl group, an ethyl group, a propyl group, a butyl group, a heptyl group, a hexyl group, a pentyl group, an octyl group, a nonyl group, a decyl group, a propenyl group, a butenyl group, a heptenyl group, a hexenyl group, an octenyl group, a decenyl group, a 2-hydroxyethyl group, a 2-hydroxypropyl group, a 2-methoxyethyl group, a 2-(methoxyethyloxo)ethyl group, a 1-(N,N-diethylamino) ethyl group, a 2-methoxypropyl group, a 2-cyanoethyl group, a 3-methyloxapropyl group, a 2-chloroethyl group, a cyclohexyl group, a cyclopentyl group, a cyclooctyl group, a chlorocyclohexyl group, a methoxycyclohexyl group, a benzyl group, a phenethyl group, a dimethoxybenzyl group, a methylbenzyl group and a bromobenzyl group).

In the group —OCOR$^2$, R$^2$ represents the same aliphatic group as in R$^1$ or a substituted or unsubstituted aromatic group having from 6 to 12 carbon atoms (examples of the aromatic group include those exemplified for the aryl group represented by R).

In the group —N(R$^3$)(R$^4$), R$^3$ and R$^4$, which may be the same or different, each represents a hydrogen atom or a substituted or unsubstituted aliphatic group having from 1 to 10 carbon atoms (such as those exemplified for R$^1$ in the group —OR$^1$).

Examples of the silane compound represented by the general formula (II) will be listed below, but the invention is not limited thereto.

Examples thereof include tetrachlorosilane, tetrabromosilane, tetramethoxysilane, tetraethoxysilane, tetraisopropoxysilane, tetra-n-propylsilane, tetra-t-butoxysilane, tetra-n-butoxysilane, dimethoxyethoxy silane, methyltrichlorosilane, methyltribromosilane, methyltrimethoxysilane, methyltriethoxysilane, methyltriisopropoxysilane, methyltri-t-butoxysilane, ethyltrichlorosilane, ethyltribromosilane, ethyltrimethoxysilane, ethyltriethoxysilane, ethyltriisopropoxysilane, ethyltri-t-butoxysilane, n-propyltrichlorosilane, n-propyltribromosilane, n-propyltrimethoxysilane, n-propyltriethoxysilane, n-propyltriisopropoxy silane, n-propyltri-t-butoxysilane, n-hexyltrichlorosilane, n-hexyltribromosilane, n-hexyltrimethoxysilane, n-hexyltriethoxysilane, n-hexyltriisopropoxysilane, n-hexyltri-t-butoxysilane, n-decyltrichlorosilane, n-decyltriboromosilane, n-decyltrimethoxysilane, n-decyltriethoxysilane, n-decyltriisopropoxysilane, n-decyltri-t-butoxysilane, n-octadecyltrichlorosilane, n-octadecyltribromosilane, n-octadecyltrimethoxysilane, n-octadecyltriethoxysilane, n-octadecyltriisopropoxysilane, n-octadecyltri-t-butoxysilane, phenyltrichlorosilane, phenyltribromosilane, phenyltrimethoxysilane, phenyltriethoxysilane, phenyltriisopropoxysilane, phenyltri-t-butoxy silane, dimethyldichlorosilane, dimethyldibromosilane, dimethyldimethoxysilane, dimethyldiethoxysilane, diphenyldichlorosilane, diphenyldibromosilane, diphenyldimethoxysilane, diphenyldiethoxysilane, phenylmethyldichlorosilane, phenylmethyldibromosilane, phenylmethyldimethoxysilane, phenylmethyldiethoxysilane, triethoxyhydrosilane, tribromohydrosilane, trimethoxyhydrosilane, isopropoxyhydrosilane, tri-t-butoxyhydrosilane, vinyltrichlorosilane, vinyltribromosilane, vinyltrimethoxysilane, vinyltriethoxysilane, vinyltriisopropoxysilane, vinyltri-t-butoxysilane, trifluoropropyltrichlorosilane, trifluoropropyltribromosilane, trifluoropropyltrimethoxysilane, trifluoropropyltriethoxysilane, trifluoropropyltriisopropoxysilane, trifluoropropyltri-t-butoxysilane, γglycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane, γ-methacryloxypropylmethyldimethoxysilane, γ-methacryloxypropylmethyldiethoxysilane, γ-methacryloxypropyltrimethoxysilane, γ-methacryloxypropyltriisopropoxysilane, γ-methacryloxypropyltri-t-butoxysilane, γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminopropyltri-t-butoxysilane, γ-mercaptopropylmethyldimethoxysilane, γ-mercaptopropylmethyldiethoxysilane, γ-mercaptopropyltrimethoxysilane, γ-mercaptopropyltriethoxysilane, γ-mercaptopropyltriisopropoxysilane, γ-mercaptopropyltri-t-butoxysilane, β-(3,4-epoxycyclohexyl) ethyltrimethoxysilane and β-(3,4-epoxycyclohexyl) ethyltriethoxysilane.

Along with the silane compound represented by the general formula (II) used for forming the inorganic hydrophilic matrix of the hydrophilic layer of this embodiment, a metallic compound that can be formed into a film by bonding to the resin on the sol-gel conversion, such as Ti, Zn, Sn, Zr and Al, may be used in combination.

Examples of the metallic compound used include $Ti(OR^5)_4$ (wherein $R^5$ represents a methyl group, an ethyl group, a propyl group, a butyl group, a pentyl group or a hexyl group), $TiCl_4$, $Ti(CH_3COCHCOCH_3)_2(OR^5)_2$, $Zn(OR^5)_2$, $Zn(CH_3COCHCOCH_3)_2$, $Sn(OR^5)_4$, $Sn(CH_3COCHCOCH_3)_4$, $Sn(OCOR^5)_4$, $SnCl_4$, $Zr(OR^5)_4$, $Zr(CH_3COCHCOCH_3)_4$, $Al(OR^5)_3$ and $Al(CH_3COCHCOCH_3)_3$.

In order to accelerate the hydrolysis reaction and the polycondensation reaction of the silane compound represented by the general formula (II) and the metallic compound used in combination, it is preferred to use an acidic catalyst or a basic catalyst in combination.

As the catalyst, an acid or a base itself or those dissolved in water or a solvent, such as an alcohol, (hereinafter referred to as an acidic catalyst or a basic catalyst, respectively) are used. The concentration herein is not particularly limited, and there is a tendency that the rate of the hydrolysis or the polycondensation is increased when the concentration is high. However, when a basic catalyst of a high concentration is used, there are cases where a precipitate is formed in a sol solution, and therefore it is preferred that the concentration of the basic catalyst is 1N or less (in terms of the concentration in an aqueous solution).

The species of the acidic catalyst and the basic catalyst is not particularly limited. Specific examples of the acidic catalyst include a hydrogen halogenide, such as hydrochloric acid, nitric acid, sulfuric acid, sulfurous acid, hydrogen sulfide, perchloric acid, hydrogen peroxide, carbonic acid, a carboxylic acid, such as formic acid and acetic acid, a substituted carboxylic acid, wherein R in the structural formula RCOOH is substituted by another element or a substituent, and a sulfonic acid, such as benzenesulfonic acid, and specific examples of the basic catalyst include an ammonical base, such as aqueous ammonia, and an amine, such as ethylamine and aniline.

The details of the sol-gel process are described in known literatures, such as S. Sakuhana, "Sol-Gel Hou no Kagaku (Science of Sol-Gel Process)" (published by Agune Shofusha (1988)), and M. Hirashima, "Saishin Sol-Gel Process niyoru Kinousei Hakumaku Sakusei Gijutu (Formation Technique of Functional Thin Film by Newest Sol-Gel Process)" (published by Sougou Gijutu Center (1992)).

Compounds for various purposes, such as control of the extent of the hydrophilicity, improvement of the physical strength of the hydrophilic layer, improvement of the dispersibility of the compositions constituting the layer improvement of the coating property and improvement of the printing suitability, may be added to the hydrophilic layer of this embodiment in addition to the foregoing components. Examples of the compounds include a plasticizer, a pigment, a coloring matter, a surface active agent and hydrophilic particles.

The hydrophilic particles are not particularly limited, and preferred examples thereof include silica, alumina, titanium oxide, magnesium oxide, magnesium carbonate and calcium alginate. These may be used for enhancing the hydrophilicity or enforcing the film. In the hydrophilic layer of the organic or inorganic hydrophilic matrix of this embodiment, it is a preferred embodiment that metallic oxide particles, such as silica, alumina and titanium oxide, are contained.

Silica has a large number of hydroxyl groups on the surface, and the interior thereof is constituted by a siloxane bond (—Si—O—Si—). Examples of the silica that can be preferably used in this embodiment include silica super-fine particles having a particle diameter of from 1 to 100 nm dispersed in water of a polar solvent, which is also referred to as a colloidal silica. Specific details thereof are described in T. Kagami and E. Hayashi, "Koujundo Silica no Ouyou Gijutu (Application Technique of High Purity Silica)", (published by CMC Publications (1991)).

Examples of the alumina that can be preferably used include alumina hydrate (boehmite series) having a colloid size of from 5 to 200 nm having been dispersed in water with an anion (for example, a halogenide ion, such as a fluoride ion and a chloride ion, and a carboxylic anion, such as acetic acid ion) as a stabilizer.

Examples of the titanium oxide that can be preferably used include anatase type or rutile type titanium oxide having an average primary particle diameter of from 50 to 500 nm dispersed in water or a polar solvent by using, depending on necessity, a dispersing agent.

The average primary particle diameter of the hydrophilic particles that can be preferably used in this embodiment is from 1 to 5,000 nm, and more preferably from 10 to 1,000 nm.

In the hydrophilic layer of this embodiment, the hydrophilic particles may be used singly as one kind or may be used in combination of two or more kinds. The usage amount thereof is from 5 to 80% by weight, preferably from 10 to 70% by weight, and more preferably from 20 to 60% by weight, based on the total solid content of the hydrophilic layer.

The hydrophilic layer of the organic or inorganic hydrophilic matrix used in this embodiment is formed, for example, in such a manner that the components are dissolved or dispersed in a solvent, such as water or a polar solvent, e.g., methanol and ethanol, solely or as a mixed solvent thereof, and the resulting solution is then coated, dried and hardened on the heat-sensitive layer.

The coating amount thereof is, in terms of the weight after drying, suitably from 0.1 to 20 g/m$^2$, preferably from 0.3 to 10 g/m$^2$, and more preferably from 0.5 to 5 g/m$^2$. If the coating amount of the hydrophilic layer after drying is less than 0.1 g/m$^2$, undesirable results are obtained such as decrease of the maintaining property of wetting water and decrease of the film strength, and if it is higher, undesirable results are also obtained such as decrease in the sensitivity and difficulty in removal at the exposed part.

The thin film of a metal or a metallic compound having a hydrophilic surface used in the hydrophilic layer of this embodiment is not particularly limited as long as it has a hydrophilic surface, and examples thereof include a metal, such as aluminum, chromium, manganese, tin, tellurium, titanium, iron, cobalt, nickel, indium, bismuth, zirconium, zinc, lead, vanadium, silicon, copper and silver, and an alloy thereof, as well as a metallic oxide, a metallic carbide, a metallic nitride, a metallic boride, a metallic sulfide and a metallic halogenide corresponding to the respective metals. The surface of the thin film of the metals and the metallic compounds is practically in a highly oxidized state, which advantageously serves as the hydrophilicity. Therefore, a thin film of a metallic oxide, such as indium tin oxide, tungsten oxide, manganese oxide, silicon oxide, titanium oxide, aluminum oxide and zirconium oxide, is preferably used as the hydrophilic layer of this embodiment.

The thin film of a metal or a metallic compound having a hydrophilic surface used in the hydrophilic layer of this embodiment can be formed by a PVD process (physical vapor deposition process), such as a vacuum vapor deposition process, a sputtering process and an ion plating process, and a CVD process (chemical vapor deposition process). Examples of the heating method in the vacuum vapor deposition process include resistance heating, high frequency induction heating and electron beam heating.

It is also possible that oxygen or nitrogen is introduced as a reactive gas, and reactive vapor deposition is conducted by using addition of ozone and ion assistance.

In the case where the sputtering process is employed, a pure metal or the objective oxide can be used as a target material, and when a pure metal is used, oxygen is introduced as a reactive gas. Examples of the sputtering power source include a direct current power source, a pulse direct current power source and a high frequency power source.

Before forming the thin film, in order to improve adhesion to the heat-sensitive layer, a substrate degasification treatment by heating the substrate or a vacuum glow treatment on the ink receiving surface may be conducted. For example, in the vacuum glow treatment, a high frequency wave is applied to the substrate under a pressure of from 1 to 10 mtorr to form glow discharge, and the substrate is treated with the resulting plasma. It is also possible that the effect is enhanced by increasing the applied voltage or introducing a reactive gas, such as oxygen and nitrogen.

The thickness of the thin film of a metal or a metallic compound having a hydrophilic surface used in the hydrophilic layer of this embodiment is preferably from 10 to 3,000 nm, and more preferably from 20 to 1,500 nm. If the film is too thin, undesirable results, such as decrease in maintaining property of the hydrophilic component of the emulsion ink and decrease in the film strength, are obtained. If the film is too thick, undesirable results, such as decrease in the image recording sensitivity, are also obtained.

Heat-Sensitive Layer

The heat-sensitive layer that can be used in this embodiment is such a layer that the surface thereof is chemically and/or physically changed by heat to decrease the adhesion to the hydrophilic layer as the upper layer, and that functions as an image portion receiving an oleophilic ink component upon printing. The heat-sensitive layer contains an organic polymer having a surface that has an oleophilic ink receiving property and a thermoplastic property (thermosoftening property) or a pyrolytic property.

The heat-sensitive layer used in this embodiment may be coated on the substrate, or in alternative, in the case where the substrate itself has such a surface that has an oleophilic ink receiving property and a thermoplastic property (thermosofteneing property) or a pyrolytic property (for example, a plastic film or a substrate having a plastic film laminated thereon), the substrate may have the function of the heat-sensitive layer. Details of the substrate will be described later.

The organic polymer used in the heat-sensitive layer of this embodiment has a function of forming an oleophilic film and also has a thermoplastic property (thermosofteneing property) or a pyrolytic property. Furthermore, it is preferred that the polymer is insoluble in a coating solvent for forming the hydrophilic layer as the upper layer, but in some cases, a polymer that is swollen with the coating solvent for the upper layer is preferred since the polymer is excellent in adhesion property to the upper layer. In the case where an organic polymer that is soluble in the coating solvent for the upper layer is used, it is preferred to conduct some measures, for example, hardening by adding a crosslinking agent in advance.

Examples of the organic polymer that can be used include polyester, polyurethane, polyurea, polyimide, polysiloxane, polycarbonate, a phenoxy resin, an epoxy resin, a phenol-formaldehyde resin, an alkylphenol-formaldehyde resin, polyvinyl acetate, an acrylic resin and a copolymer thereof, polyvinyl phenol, polyvinyl halogenated phenol, a methacrylic resin and a copolymer thereof, an acrylamide copolymer, a methacrylamide copolymer, polyvinyl formal, polyamide, polyvinyl butyral, polystyrene, a cellulose ester resin, polyvinyl chloride and polyvinylidene chloride.

Among these, a resin having a hydroxyl group, a carboxyl group, a sulfonamide group or a trialkoxysilyl group on the side chain is preferred since it is excellent in adhesion property to the substrate and the hydrophilic layer as the upper layer, and in some cases, it is easily hardened with a crosslinking agent. Furthermore, a polymer obtained by photo-curing an acrylonitrile copolymer, polyurethane, a copolymer having a sulfonamide group on the side chain or a copolymer having a hydroxyl group on the side chain with a diazo resin is preferable.

Examples of the usable resin also include a novolak resin and a resol resin formed by condensation of formaldehyde and a phenol compound, such as phenol, cresol (such as m-cresol, p-cresol and a mixture of m-cresol and p-cresol), a mixture of phenol and cresol (such as m-cresol, p-cresol and a mixture of m-cresol and p-cresol), phenol-modified xylene, tert-butylphenol, octylphenol, resorcinol, pyrogallol, catechol, chlorophenol (such as m-chlorophenol and p-chlorophenol), bromophenol (such as m-bromophenol and p-bromophenol), salicylic acid and phloroglucinol, and a condensed resin of the phenol compound and acetone.

Examples of the preferred resin further include a copolymer that generally has a molecular weight of from 10,000 to 200,000 having the following monomers (1) to (12) as a constitutional unit:

(1) an acrylamide, a methacrylamide, an acrylate, a methacrylate and a hydroxystyrene that have an aromatic hydroxyl group, for example, N-(4-hydroxyphenyl) acrylamide, N-(4-hydroxyphenyl)methacrylamide, o-, m- or p-hydroxystyrene, and o-, m- or p-hydroxyphenyl acrylate or methacrylate;

(2) an acrylate and a methacrylate that have an aliphatic hydroxyl group, for example, 2-hydroxyethyl acrylate and 2-hydroxyethyl methacrylate;

(3) a (substituted) acrylate, for example, methyl acrylate, ethyl acrylate, propyl acrylate, butyl acrylate, amyl acrylate, hexyl acrylate, cyclohexyl acrylate, octyl acrylate, phenyl acrylate, benzyl acrylate, 2-chloroethyl acrylate, 4-hydroxybutyl acrylate, glycidyl acrylate and N-dimethylaminoethyl acrylate;

(4) a (substituted) methacrylate, for example, methyl methacrylate, ethyl methacrylate, propyl methacrylate, butyl methacrylate, amyl methacrylate, hexyl methacrylate, cyclohexyl methacrylate, octyl methacrylate, phenyl methacrylate, benzyl methacrylate, 2-chloroethyl methacrylate, 4-hydroxybutyl methacrylate, glycidyl methacrylate and N-dimethylaminoethyl methacrylate;

(5) an acrylamide and a methacrylamide, for example, acrylamide, methacrylamide, N-methylolacrylamide, N-methylolmethacrylamide, N-ethylacrylamide, N-ethylmethacrylamide, N-hexylacrylamide, N-hexylmethacrylamide, N-cyclohexylacrylamide, N-cyclohexylmethacrylamide, N-hydroxyethylacrylamide, N-hydroxyethylmethacrylamide, N-phenylacrylamide, N-phenylmethacrylamide, N-benzylacrylamide, N-benzylmethacrylamide, N-nitrophenylacrylamide, N-nitrophenylmethacrylamide, N-ethyl-N-phenylacrylamide and N-ethyl-N-phenylmethacrylamide;

(6) a vinyl ether, for example, ethyl vinyl ether, 2-chloroethyl vinyl ether, hydroxyethyl vinyl ether, propyl vinyl ether, butyl vinyl ether, octyl vinyl ether and phenyl vinyl ether;

(7) a vinyl ester, for example, vinyl acetate, vinyl chloroacetate, vinyl butyrate and vinyl benzoate;

(8) a styrene, for example, styrene, methylstyrene and chloromethylstyrene;

(9) a vinyl ketone, for example, methyl vinyl ketone, ethyl vinyl ketone, propyl vinyl ketone and phenyl vinyl ketone;

(10) an olefin, for example, ethylene, propylene, isobutylene, butadiene and isoprene;

(11) N-vinylpyrrolidone, N-vinylcarbazole, 4-vinylpyridine, acrylonitrile and methacrylonitrile; and

(12) an acrylamide, for example, N-(o-aminosulfonylphenyl)acrylamide, N-(m-aminosulfonylphenyl)acrylamide, N-(p-aminosulfonylphenyl)acrylamide, N-(1-(3-aminosulfonyl)naphthyl)acrylamide and N-(2-aminosulfonylethyl)acrylamide, a methacrylamide, for example, N-(o-aminosulfonylphenyl)methacrylamide, N-(m-aminosulfonylphenyl)methacrylamide, N-(p-aminosulfonylphenyl)methacrylamide, N-(1-(3-aminosulfonyl)naphthyl)methacrylamide and N-(2-aminosulfonylethyl)methacrylamide, an unsaturated sulfonamide of an acrylate, for example, o-aminosulfonylphenyl acrylate, m-aminosulfonylphenyl acrylate, p-aminosulfonylphenyl acrylate and 1-(3-aminosulfonylphenylnaphthyl) acrylate, and an unsaturated sulfonamide of a methacrylate, for example, o-aminosulfonylphenyl methacrylate, m-aminosulfonylphenyl methacrylate, p-aminosulfonylphenyl methacrylate and 1-(3-aminosulfonylphenylnaphthyl) methacrylate.

Examples of the pyrolytic organic polymer used in this embodiment include nitrocellulose and a binder used for the so-called "chemical amplification system" disclosed in J. Imaging Sci., p. 59–64, vol. 30(2) (1986) (Frechet, et al.), Polymers in Electronics (Symposium Series, p. 11, 242, T. Davidson, Ed., ACS Washington, D.C. (1984) (Ito and Willson) and Microelectronic Engineering, p. 3–10, vol. 13 (1991) (E. Reichmanis and L. F. Thompson), but the present invention is not limited thereto.

The polymer compound may be used singly or in a combination of two or more.

The organic polymer is dissolved in an appropriate solvent and then coated and dried on the substrate to provide the heat-sensitive layer on the substrate. The organic polymer may be solely dissolved in a solvent, but in general, the organic polymer is used along with a crosslinking agent, an adhesion assistant, a coloring agent, inorganic or organic fine particles, a coating surface improving agent and a plasticizer.

In the heat-sensitive layer, a pyrolytic compound for increasing the laser recording sensitivity, a photothermal conversion substance and a thermal coloring system or a thermal decoloring system for forming a print out image after exposure may be added.

Specific examples of the known crosslinking agent for crosslinking the organic polymer include a diazo resin, an aromatic diazo compound, a polyfunctional isocyanate compound, a polyfunctional epoxy compound, a polyfunctional amine compound, a polyol compound, a polyfunctional carboxyl compound, an aldehyde compound, a polyfunctional (meth)acrylic compound, a polyfunctional vinyl compound, a polyfunctional mercapto compound, a polyvalent metallic salt compound, a polyalkoxysilane compound, a polyalkoxytitanium compound, a polyalkoxyaluminum compound, a polymethylol compound and a polyalkoxymethyl compound, and a known reaction catalyst may be added to accelerate the reaction. The usage amount thereof is from 0 to 50% by weight, preferably from 3 to 40% by weight, and more preferably from 5 to 35% by weight, based on the total solid content of the coating liquid for the heat-sensitive layer.

As the adhesion assistant, the diazo resin is excellent in adhesion between the substrate and the hydrophilic layer, and also a silane coupling agent, an isocyanate compound and a titanium series coupling agent are useful.

As the coloring agent, ordinary dyes and pigments can be used, and particularly, examples thereof include Rhodamine 6G chloride, Rhodamine B chloride, Crystal Violet, Malachite Green oxalate, Oxazine 4 perchlorate, quinizarin, 2-($\alpha$-naphthyl)-5-phenyloxazole and coumarin 4. Specific examples of the other dyes include trephenylmethane series, diphenylmethane series, oxazine series, xanthene series, iminonaphthoquinone series, azomethine series and anthraquinone series dyes, such as Oil Yellow #101, Oil Yellow #103, Oil Pink #312, Oil Green BG, Oil Blue BOS, Oil Blue #603, Oil Black BY, Oil Black BS, Oil Black T-505 (all produced by Orient Chemical Industries, Ltd.), Victoria Pure Blue, Crystal Violet (C.I. 42555), Methyl Violet (C.I. 42535), Ethyl Violet, Methylene Blue (C.I. 52015), Patent Pure Blue (produced by Sumitomo Mikuni Chemical Co., Ltd.), Brilliant Blue, Methyl Green, Erythricine B, basic fuchsin, m-Cresol Purple, auramine, 4-p-diethylaminophenyliminaphthoquisine, and cyano-p-diethylaminophenylacetanilide, and the dyes disclosed in JP-A-62-293247 and Japanese Patent Application No. 7-335145.

When the dye is added to the heat-sensitive layer, it is generally present in an amount of about from 0.02 to 10% by weight, and preferably about from 0.1 to 5% by weight, based on the total solid content of the heat-sensitive layer.

A fluorine series surface active agent and a silicone series surface active agent, which are well known as a coating surface improving agent, can be used. Specifically, a surface active agent having a perfluoroalkyl group or a dimethylsiloxane group is useful for setting the coating surface.

Examples of the inorganic or organic fine powder include colloidal silica and colloidal aluminum each having a diameter of from 10 to 100 nm, and inert particles having a diameter larger than the colloid, such as silica particles, silica particles having a hydrophobic surface, alumina particles, titanium dioxide particles, other heavy metal particles, clay and talc. When the inorganic or organic fine powder is added to the heat-sensitive layer, the adhesion property to the hydrophilic layer as the upper layer is improved to enhance the printing durability upon printing. The addition amount of the fine powder in the heat-sensitive layer is preferably 80% by weight or less, and more preferably 40% by weight or less, based on the total amount.

In the heat-sensitive layer of this embodiment, a pyrolytic compound is added for improving the laser recording sensitivity. As such a compound, a known compound that generates a gas by decomposition upon heating can be added. In this case, the laser recording sensitivity can be improved by abrupt increase in volume on the surface of the heat-sensitive layer. Examples of the additive include dinitropentamethylene tetramine, N,N'-dimethyl-N,N'-dinitrosoterephthalamide, p-toluenesulfonylhydrazide, 4,4-oxybis(benzenesulfonylhydrazide) and diamidebenzene.

As the pyrolytic compound improving the laser recording sensitivity, a compound known as a thermal acid generating agent that generates an acidic compound through decomposition by heating, such as various kinds of an iodonium salt, a sulfonium salt, sulfonium tosylate, oxime sulfonate, dicarbodiimide sulfonate and triazine, can be used. When these compounds are used with a chemical sensitizing binder, the decomposition temperature of the chemical sensitizing binder that is the constitutional substance of the heat-sensitive layer, and as a result, the laser recording sensitivity can be increased.

The addition amount thereof is preferably from 1 to 20% by weight, and more preferably from 5 to 10% by weight, based on the total amount of the heat-sensitive layer.

Furthermore, in order to increase the laser recording sensitivity, the dye or pigment having infrared absorption property exemplified as the photothermal conversion agent may be added to the heat-sensitive layer of this embodiment. In the case where it is added to the heat-sensitive layer, an oleophilic dye or pigment may be used. The addition amount thereof is preferably from 1 to 20% by weight, and more preferably from 5 to 15% by weight, based on the total amount of the heat-sensitive layer.

In the heat-sensitive layer of this embodiment, a plasticizer may be added to impart flexibility to the coated film. Examples thereof include polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate and an oligomer or a polymer of acrylic acid or methacrylic acid.

In order to clearly distinguish the image portion and the non-image portion upon exposure, a compound of a coloring system or a decoloring system is preferably added to the heat-sensitive layer of this embodiment. For example, a leuco dye (such as Leuco Malachite Green, Leuco Crystal Violet and a lactonized compound of Crystal Violet) and a PH discoloration dye (for example, a dye, such as Ethyl Violet and Victoria Pure Blue BOH) are used along with a thermal acid generating agent, such as a diazo compound and a diphenyliodonium salt. The combination of an acid coloring dye and an acidic binder disclosed in EP 897134 is also effective. In this case, the bond of the association state forming the dye is broken by heat, and a lactonized compound is formed to change from a colored substance to a colorless substance.

The addition amount of the coloring system is preferably 10% by weight or less, and preferably 5% by weight or less, based on the total amount of the heat-sensitive layer.

Examples of the solvent used for coating to form the heat-sensitive layer include an alcohol (such as methanol, ethanol, propyl alcohol, ethylene glycol, diethylene glycol, propylene glycol, dipropylene glycol, ethylene glycol monomethyl ether, propylene glycol monomethyl ether and ethylene glycol monoethyl ether), an ether (such as tetrahydrofuran, ethylene glycol dimethyl ether, propylene glycol dimethyl ether and tetrahydropyran), a ketone (such as acetone, methyl ethyl ketone and acetylacetone), an ester (such as methyl acetate and ethylene glycol monomethyl monoacetate), an amide (such as formamide, N-methylformamide, pyrrolidone and N-methylpyrrolidone), γ-butyrolactone, methyl lactate and ethyl lactate.

The solvents are used singly or as a mixture. Upon preparing a coating liquid, the concentration of the constitutional components of the heat-sensitive layer (all the solid contents including the additives) in the solvent is preferably from 1 to 50% by weight. In addition to the coating from the organic solvent, the coating film may be formed with an aqueous emulsion. In this case, the concentration is preferably from 5 to 50% by weight.

The thickness of the heat-sensitive layer in this embodiment after coating and drying is not particularly limited, and may be from 0.05 to 5 g/m$^2$, and preferably from 0.05 to 3 g/m$^2$. In the case where the heat-sensitive layer is formed on a metallic plate, it is desirably 0.5 g/m$^2$ or more, and more preferably from 0.5 to 3 g/m$^2$ since it functions as a thermal insulating layer.

If the heat-sensitive layer is too thin, the generated heat is scattered toward the metallic plate to decrease the sensitivity. In the case of the hydrophilic metallic plate, furthermore, since the heat-sensitive layer is required to have wearing resistance as an ink receiving layer, the printing durability cannot be maintained. In the case where an oleophilic plastic film is used as the substrate, since scattering of heat is low, the coating amount can be smaller than the case of the metallic film and is preferably 0.05 g/m$^2$ or more, and the coating amount after drying is preferably about from 0.05 to 3 g/m$^2$.

Substrate

As the substrate for the lithographic printing plate original that can be applied to the method of this embodiment, a plate having properties, such as strength and durability, that are required for a lithographic printing plate and having dimensional stability can be used through appropriate selection, and examples thereof include paper, paper having oleophilic plastics (such as polyethylene, polypropylene and polystyrene) laminated thereon, a metallic plate (such as aluminum, zinc, copper, nickel and stainless steel), a plastic film (such as cellulose diacetate, cellulose triacetate, cellulose propionate, cellulose lactate, cellulose acetate lactate, cellulose nitrate, polyethylene terephthalate, polyethylene, polystyrene, polypropylene, polycarbonate and polyvinyl acetal) and the plastic film having a oleophilic organic polymer resin coated thereon.

Preferred examples of the substrate include a polyethylene terephthalate film, a polycarbonate film, an aluminum or steel plate and an aluminum or steel plate having an oleophilic plastic film laminated thereon.

An aluminum plate that is preferably used in this embodiment is a pure aluminum plate, an alloy plate containing aluminum as the main component and a slight amount of other elements, and those having an ink receiving polymer compound coated thereon or having an ink receiving plastic film laminated thereon.

Examples of the other elements contained in the aluminum alloy include silicon, iron, manganese, copper, magnesium, chromium, zinc, bismuth, nickel and titanium. The content of the other elements in the alloy is 10% by weight at most. An aluminum plate formed with a conventionally known material can be used as the aluminum plate applied to this embodiment.

It is preferred that the surface of the aluminum plate is subjected to roughening before use. In the case where the ink receiving layer containing an organic polymer is coated on the substrate, the adhesion between the substrate and the ink receiving layer can be ensured by conducting the roughening treatment.

The roughening treatment will be described in order. Before conducting the roughening treatment, a degreasing treatment with a surface active agent, an organic solvent or an alkaline aqueous solution is conducted to remove a rolling oil on the surface of the aluminum substrate.

The roughening treatment of the surface of the aluminum plate is conducted by various methods, and for example, a method of mechanically roughening, a method of electrochemically dissolving the surface to be roughened and a method of chemically and selectively dissolving the surface are generally employed. As the method of mechanically roughening, a known method, such as a ball grinding method, a brush grinding method, a blast grinding method and a buff grinding method, can be used. As the chemical roughening method, a method of immersing in a saturated aqueous solution of an aluminum salt of a mineral acid as disclosed in JP-A-54-31187 is suitable. As the electrochemical roughening method, a method where the electrochemical roughening is conducted with an alternating current or a direct current in an electrolyte containing an acid, such as hydrochloric acid and nitric acid. An electrolytic roughening method using a mixed acid as disclosed in JP-A-54-63902 can also be utilized.

The roughening by the foregoing methods is preferably conducted to such an extent that the center line surface roughness (Ha) of the surface of the aluminum plate is in the range of from 0.3 to 1.0 $\mu$m.

The aluminum plate having the surface having been roughened is subjected, depending on necessity, to an alkali etching treatment using an aqueous solution of potassium hydroxide or sodium hydroxide, followed by subjecting to a neutralizing treatment, and is further subjected to an anodic oxidation treatment to increase the wear resistance depending on necessity.

As the electrolyte used in the anodic oxidation treatment of the aluminum plate, various electrolytes that form a porous oxide film can be used, and in general, sulfuric acid, hydrochloric acid, oxalic acid, chromic acid and a mixed acid thereof are used. The concentration of the electrolyte is appropriately selected depending on the species of the electrolyte.

The treatment conditions for the anodic oxidation cannot be determined without condition since they vary depending on the species of the electrolyte used, and in general, appropriate conditions include a concentration of the electrolyte of from 1 to 80% by weight, a liquid temperature of from 5 to 70° C., an electric current density of from 5 to 60 A/dm$^2$, a voltage of from 1 to 100 V and an electrolysis time of from 10 seconds to 5 minutes.

The amount of the oxide film thus formed is preferably from 1.0 to 5.0 g/m$^2$, and particularly preferably from 1.5 to 4.0 g/m$^2$.

In the case where a non-electroconductive substrate, such as polyester, is used as the substrate of this embodiment, it is preferred that an antistatic layer is formed on the side of the heat-sensitive layer of the substrate, the opposite side to the heat-sensitive layer thereof, or both sides thereof. As the antistatic layer, a polymer layer having metallic oxide fine particles or a matting agent dispersed therein can be used.

Examples of the material for the metallic oxide fine particles include $TiO_2$, $ZnO$, $SnO_2$, $Al_2O_3$, $In_2O_3$, $MgO$, $BaO$, $MoO_3$, $V_2O_5$, a complex oxide thereof and these metallic oxide further having a hetero atom. These metallic oxide may be used singly or in combination of two or more thereof. As the metallic oxide, $ZnO$, $SnO_2$, $Al_2O_3$, $In_2O_3$ and $MgO$ are preferred, $ZnO$, $SnO_2$, $Al_2O_3$ and $In_2O_3$ are more preferred, and $SnO_2$ is particularly preferred.

Examples of the metallic oxide containing a small amount of a hetero atom include $ZnO$ doped with Al or In, $SnO_2$ doped with Sb, Nb or a halogen element and $In_2O_3$ doped with Sn, in an amount of from 30 to 10% by mole.

It is preferred that the metallic oxide fine particles are contained in the antistatic layer in an amount of from 10 to 90% by weight. The average particle diameter of the metallic oxide fine particles is preferably from 0.001 to 0.5 $\mu$m. The average particle diameter used herein is a value considering not only the primary particle diameter but also the particle diameter of particles having higher order structures of the metallic oxide fine particles.

Examples of the matting agent used in the antistatic layer include inorganic or organic particles having an average particle diameter of from 0.5 to 20 $\mu$m, and more preferably from 1.0 to 15 $\mu$m. Examples of the inorganic particles include a metallic oxide, such as silicon oxide, aluminum oxide, titanium oxide and zinc oxide, and a metallic salt such as calcium carbonate, barium sulfate, barium titanate and strontium titanate. Examples of the organic particles include crosslinked particles of polymethyl methacrylate, polystyrene, polyolefin and a copolymer thereof.

The matting agent is preferably contained in the antistatic layer in an amount of from 1 to 30% by weight.

Examples of the polymer that can be used in the antistatic layer include protein, such as gelatin and casein, a cellulose compound, such as carboxymethyl cellulose, hydroxyethyl cellulose, acetyl cellulose, diacetyl cellulose and triacetyl cellulose, a saccharide, such as dextran, agar, sodium alginate and a starch derivative, and a synthetic polymer such as polyvinyl alcohol, polyvinyl acetate, polyacrylate, polymethacrylate, polystyrene, polyacrylamide, polyvinylpyrrolidone, polyester, polyvinyl chloride, polyacrylic acid and polymethacrylic acid.

The polymer is preferably contained in the antistatic layer in an amount of from 10 to 90% by weight.

The substrate used in this embodiment preferably has a maximum roughness depth (Rt) of the back surface of the substrate of 1.2 µm or more for the prevention of blocking, and preferably has a dynamic friction coefficient (µk) of 2.6 or less, which is measured by contacting the back surface of the substrate (i.e., the back surface of the lithographic printing plate original of this embodiment) and the surface of the lithographic printing plate original of this embodiment.

The thickness of the substrate used in this embodiment is generally about from 0.05 to 0.6 mm, preferably from 0.1 to 0.4 mm, and particularly preferably from 0.15 to 0.3 mm.

The lithographic printing plate original that can be subjected to the printing process of this embodiment has the foregoing constitution. The image recording process and the printing process of the lithographic printing plate original will be described below.

Image Recording Process

The image recording of the lithographic printing plate original of this embodiment includes a step of imagewise heating by heating or exposure to laser light. For example, the step is effected by imagewise heat-sensitive recording directly by a thermal recording head, imagewise scanning exposure by a solid laser or a semiconductor laser emitting an infrared ray having a wavelength of from 700 to 1,200 nm, or photothermal conversion type exposure, such as planar exposure by a light source, for example, with high illuminance flash light, such as that from a xenon discharge lamp, or an infrared ray lamp.

In this embodiment, laser light is particularly preferably used. The energy of the laser light used for image recording is adsorbed and converted to heat energy by the photothermal conversion substance contained in the heat-sensitive lithographic printing plate original of this embodiment, and the heat-sensitive lithographic printing plate original of this embodiment is imagewise heated by the heat thus generated to enable release of the heated part of the hydrophilic layer, whereby the image recording is effected.

The laser used for recording in this embodiment is not particularly limited as long as it can provide an exposure amount that is necessary for generating heat sufficient to effect recording on the heat-sensitive lithographic printing plate original of this embodiment. Usable examples thereof include a gas laser, such as an Ar laser and a carbon dioxide gas laser, a solid laser, such as a YAG laser, and a semiconductor laser, and in general, a laser of a class having an output power of 50 mW or higher is necessary. A semiconductor laser and a solid laser excited by a semiconductor (such as a YAG laser) are preferably used from the practical standpoint of maintainability and cost. The recording wavelength of the laser is in a wavelength region of an infrared ray, and an oscillation wavelength of from 700 to 1,200 nm is often used. It is also possible to conduct the exposure by using an imaging apparatus disclosed in JP-A-6-186750.

Developing and Printing Steps

The heat-sensitive lithographic printing plate original of this embodiment can be subjected to printing in such a manner that the original plate having been subjected to image recording can be mounted on a printing machine to be used for printing without subjecting any further treatment, i.e., without a development treatment.

When the lithographic printing plate having been subjected to image recording is mounted on a printing machine, and printing is started by using an emulsion ink, the overcoat layer is removed with the hydrophilic component of the emulsion ink, and simultaneously, the hydrophilic layer at the exposed part, which is decreased in adhesion property to the heat-sensitive layer, is also removed. Thus, the development is effected, whereby the hydrophilic layer remaining as a non-exposed part becomes an ink repelling region (non-image portion), and the hydrophilic component of the emulsion ink is attached to the hydrophilic layer. The part where the hydrophilic layer is released to expose the oleophilic heat-sensitive layer forms a region of high affinity to the ink (image portion), and the oleophilic ink component in the emulsion ink is attached to the exposed heat-sensitive layer, so as to start printing.

EXAMPLES

The first embodiment of the invention will be described in more detail with reference to the following examples, but the invention is not construed as being limited thereto.

Example 1

Preparation of Aluminum Substrate

A rolled plate of an aluminum material according to JIS A1050 having a thickness of 0.24 mm containing 99.5% by weight of aluminum, 0.01% by weight of copper, 0.03% by weight of titanium, 0.3% by weight of iron and 0.1% by weight of silicon was subjected to sand toothing with an aqueous suspension of PUMICETON (produced by Kyoritsu Ceramic Materials Co., Ltd.) of a concentration of 20% by weight and a rotational nylon brush (6,10-nylon), followed by being washed with water.

The aluminum plate was immersed in an aqueous solution of sodium hydroxide of a concentration of 15% by weight to conduct etching to a dissolved amount of aluminum of 5 g/m$^2$, followed by washing with flowing water. It was neutralized with nitric acid of a concentration of 1% by weight, and further subjected to an electrolytic roughening treatment in a nitric acid aqueous solution of a concentration of 0.7% by weight (containing 0.5% by weight of aluminum) by an electric current of a block pulse alternating wave form having a voltage at an anode of 10.5 V and a voltage at a cathode of 9.3 V (current ratio: 0.90, the wave form of an electric current disclosed in the Example of JP-B-58-5796) at an anodic quantity of electricity of 160 C/dm$^2$.

After washing with water, the plate was immersed in an aqueous solution of sodium hydroxide of a concentration of 10% by weight to effect etching to a dissolved amount of aluminum of 1 g/m2, followed by washing with water. It was then immersed in a sulfuric acid aqueous solution of a concentration of 30% by weight at 50° C. to effect a desmut treatment, followed by washing with water.

Furthermore, it was subjected to a treatment for forming a porous anodic oxidation film in a nitric acid aqueous solution of a concentration of 20% by weight at 35° C. (containing 0.8% by weight of aluminum) by using a direct current. That is, electrolysis was effected at an electric density of 13 A/dm$^2$ to make the amount of the anodic oxidation film to 2.7 g/m$^2$ by adjusting the electrolysis time.

The substrate was washed with water and subjected to an immersion treatment in an aqueous solution of sodium silicate of a concentration of 0.2% by weight at 70° C. for 30 seconds, followed by washing with water and drying.

The aluminum substrate thus produced had a reflection density of 0.30 measured with a reflection densitometer, Macbeth RD920, and a center line average roughness of 0.58 μm.

Formation of Heat-Sensitive Layer

The following heat-sensitive layer coating composition was coated on the aluminum substrate, followed by drying with heat (100° C. for 1 minute), so as to form a heat-sensitive layer having a dry coating amount of 1 g/m$^2$.

Heat-sensitive Layer Coating Composition 1

| | |
|---|---|
| Epoxy resin (EPICOTE 1010, produced by Yuka-Shell Epoxy Co., Ltd.) | 5 g |
| γ-Butyrolactone | 9.5 g |
| Methyl lactate | 3 g |
| Methyl ethyl ketone | 22.5 g |
| Propylene glycol monomethyl ether | 22 g |

Formation of Hydrophilic Layer

The following coating composition was coated on the heat-sensitive layer, followed by drying with heat (100° C. for 1 minute), so as to form a hydrophilic layer having a dry coating amount of 1 g/m$^2$.

Hydrophilic Layer Coating Composition 1

| | |
|---|---|
| 10% Ethylene glycol monomethyl ether solution of 2-hydroxyethyl methacrylate homopolymer (weight average molecular weight: 250,000) | 1 g |
| Methanol silica (produced by Nissan Chemical Industries, Ltd., colloid of methanol solution containing 30% by weight of silica particles of from 10 to 20 nm) | 3 g |
| Methanol | 16 g |

Formation of Overcoat Layer

The following coating composition was coated on the hydrophilic layer, followed by drying with heat (100° C. for 2 minutes), so as to form an overcoat layer having a dry coating amount of about 0.6 g/m$^2$. Thus, a lithographic printing plate original was completed.

Overcoat Layer Coating Composition 1

| | |
|---|---|
| Polyacrylic acid (weight average molecular weight: 25,000, produced by Wako Pure Chemical Industries, Ltd.) | 1 g |
| Infrared ray absorbing dye (example compound (I-32)) | 0.2 g |
| Polyoxyethylene nonylphnyl ether | 0.025 g |
| Water | 19 g |

Preparation of Lithographic Printing Plate

Laser Exposure

When the lithographic printing plate original was exposed from the side of the overcoat layer by a 40 W TREND SETTER produced by CREO Inc. (plate setter having a 830 nm semiconductor laser of 40 W) with energy of 300 mJ/cm$^2$, image recording could be conducted without scattering of dusts due to ablation.

Evaluation of Printing

The lithographic printing plate original having been subjected to the image recording was mounted on a printing machine (Heidelberg SOR-M) without subjecting to any treatment, and printing was effected by using an emulsion ink having the following composition. As a result, the overcoat layer and the hydrophilic layer at the laser exposed part were rapidly removed from the plate surface on the printing machine in the initial stage of printing, and 20,000 sheets of printed matter having no contamination on the non-image portion and no dropout on the image portion were obtained.

Preparation of Emulsion Ink

Emulsion Ink Composition 1

(1) Preparation of varnish

Hereinafter, "parts" are parts by weight.

| | |
|---|---|
| Varnish A | |
| Maleic petroleum resin (Neopolymer 120, produced by Nippon Oil Co., Ltd.) | 47 parts |
| Spindle oil | 53 parts |
| Gel varnish B | |
| Rosin-modified phenol resin (TAMANOL 354, produced by Arakawa Chemical Industries, Ltd.) | 34 parts |
| Machine oil | 31 parts |
| Spindle oil | 31 parts |
| Aluminum stearate | 4 parts |
| Varnish C | |
| Gilsonite | 25 parts |
| Machine oil | 75 parts |

(2) Preparation of Oleophilic Ink Component

| | |
|---|---|
| Carbon black | 14 parts |
| Calcium carbonate (HAKUENKA DD, produced by Shiroisi Kogyo Co., Ltd.) | 5 parts |
| Varnish A | 27 parts |
| Gel varnish B | 7 parts |
| Varnish C | 11 parts |
| Linseed oil | 4 parts |
| Machine oil | 6 parts |
| Spindle oil | 24 parts |
| Cyanine Blue | 1 part |

(3) Preparation of Hydrophilic Component

| | |
|---|---|
| Purified water | 10 parts |
| Propylene glycol | 55 parts |
| Glycerin | 34 parts |
| Surface active agent (polyoxyethylene alkylphenyl ether, LIPONOX NCE, produced by Lion Corp.) | 1 part |

100 parts by weight of the oleophilic ink component obtained in the preparation of an oleophilic ink component (2) and 70 parts by weight of the hydrophilic component obtained in the preparation of a hydrophilic component (3) were mixed by agitation to prepare a W/O type emulsion ink.

Example 2

A heat-sensitive lithographic printing plate original was obtained in the same manner as in Example 1 except that the formation of the hydrophilic layer was changed to the following. The original plate was subjected to exposure with laser light in the same manner as in Example 1, and thus image recording could be conducted without scattering of dusts due to ablation. Furthermore, when the original plate was subjected to evaluation of printing in the same manner as in Example 1, the overcoat layer and the hydrophilic layer at the laser exposed portion were rapidly removed from the plate surface on the printing machine in the initial stage of printing, and 20,000 sheets of printed matter having no contamination on the non-image portion and no dropout on the image portion were obtained.

Formation of Hydrophilic Layer

The following coating composition was coated on the heat-sensitive layer of Example 1, followed by drying with heat (100° C. for 10 minutes), so as to form a hydrophilic layer having a dry coating amount of 1 g/m$^2$.

Hydrophilic Layer Coating Composition 2

| | |
|---|---|
| Aqueous dispersion of 20% of titanium oxide and 10% of polyvinyl alcohol (weight ratio: 2/1) (titanium oxide: rutile type, average particle diameter: 200 nm, produced by Wako Pure Chemical Industries, Ltd.) (polyvinyl alcohol: PVA 117 produced by Kuraray Co., Ltd.) | 8 g |
| 20% Aqueous dispersion of silica gel (average particle diameter: about 10 nm, SNOWTEX C, produced by Nissan Chemical Industries, Ltd.) | 4 g |
| Sol-gel conditioning liquid 1 (having composition below) | 4 g |
| Water | 20 g |

Preparation of Sol-gel Conditioning Liquid 1

A liquid of the following composition was aged at room temperature for 1 hour to prepare a sol-gel conditioning liquid.

| | |
|---|---|
| Tetramethoxy silane | 11.0 g |
| Ethanol | 20.7 g |
| 0.1N Nitric acid | 4.5 g |

Example 3

Preparation of Substrate

Both surfaces of a polyethylene terephthalate film having a thickness of 180 μm were subjected to a corona discharge treatment, and the following coating composition was coated on the treated surface, followed by drying with heat (at 180° C. for 30 seconds), so as to form an antistatic layer having a dry thickness of 0.2 g/m$^2$.

Antistatic Layer Coating Composition

| | |
|---|---|
| Aqueous dispersion of acrylic resin (solid content: 20% by weight, JULIMER ET-410, produced by Nippon Junyaku Co., Ltd.) | 20 g |
| Aqueous dispersion of tin oxide and antimony oxide (average particle diameter: 0.1 μm, 17% by weight) | 36 g |
| Polyoxyethylene nonylphenyl ether (NONIPOL 100, produced by Sanyo Chemical Industries, Ltd.) | 0.6 g |
| Aqueous solution of alkyl diphenyl ether sodium disulfonate (concentration: 40% by weight, SANDET BL, produced by Sanyo Chemical Industries, Ltd.) | 0.6 g |
| Melamine compound (concentration of active component: 80% by weight, SUMITEX RESIN M-3, produced by Sumitomo Chemical Industries, Ltd.) | 0.2 g |
| Polymethacrylic acid resin particles (average particle diameter: 5 μm, MX-500, produced by Soken Chemical and Engineering Co. Ltd.) | 0.2 g |
| Water | 42.4 g |

Formation of Heat-Sensitive Layer

The following heat-sensitive layer coating composition was coated on the polyethylene terephthalate substrate, followed by drying with heat (100° C. for 1 minute), so as to form a heat-sensitive layer having a dry coating amount of 1 g/m$^2$.

Heat-sensitive Layer Coating Composition 1

| | |
|---|---|
| N-(p-Aminosulfonylphenyl)methacrylamide/ methyl methacrylate/acrylonitrile/ 2-hydroxyethyl methacrylate copolymer (copolymerization ratio: 40/10/30/20% by weight) | 3 g |
| Silica gel dispersion (3% methanol dispersion of methyl-modified silica gel, average particle diameter: 12 nm, R974, produced by Nippon Aerosol Co., Ltd.) | 12 g |
| Ethylene glycol monomethyl ether | 50 g |
| Methyl ethyl ketone | 47 g |

Formation of Hydrophilic Layer

A titanium oxide film was formed on the heat-sensitive layer to a thickness of 20 nm by using a batch type sputtering film formation apparatus (CFS-10-EP70, produced by Shibaura Eletec Corp.) under the following conditions to form a hydrophilic layer.

| | |
|---|---|
| Target material: | pure titanium (purity: 3N) |
| Atmosphere: | mixed gas of argon/oxygen (60/40 by gas flowing rate) |
| Pressure on film formation: | 2.7 mtorr |
| Power: | DC 1 kW (power source: SPS-2HSDC-4A, produced by Shibaura Eletec Corp.) |

Before the film formation, a glow treatment was conducted under the following conditions.

| Atmosphere: | argon |
|---|---|
| Pressure on treatment: | 5.0 mtorr |
| Power: | Rf 3 kW |
| | (power source: JRF-3000, produced by JEOL Ltd.) |
| Time: | 2.5 minutes |

Preparation of Lithographic Printing Plate

Formation of Overcoat Layer

The following coating composition was coated on the hydrophilic layer, followed by drying with heat (100° C. for 2 minutes), so as to form an overcoat layer having a dry coating amount of about 0.6 g/m². Thus, a lithographic printing plate original was completed.

Overcoat Layer Coating Composition 2

| Gum arabic | 1 g |
|---|---|
| Infrared ray absorbing dye (I-32) | 0.2 g |
| Polyoxyethylene nonylphenyl ether | 0.025 g |
| Water | 19 g |

Laser Exposure

Image Recording

When the lithographic printing plate original having the overcoat layer was subjected to laser exposure from the side of the overcoat layer by PEARL SETTER 74 produced by RESSTEK Inc., image recording could be conducted without scattering of dusts due to ablation.

Evaluation of Printing

The lithographic printing plate original having been subjected to the image recording was mounted on a printing machine (RYOBI 3200CCD) without subjecting to any treatment, and printing was effected by using an emulsion ink having the following composition. As a result, the overcoat layer and the hydrophilic layer at the laser exposed part were rapidly removed from the plate surface on the printing machine in the initial stage of printing, and 20,000 sheets of printed matter having no contamination on the non-image portion and no dropout on the image portion were obtained.

Preparation of Emulsion Ink

Emulsion Ink Composition 2
(1) Preparation of Varnish
  Hereinafter, "parts" are parts by weight.
  The following composition was gelled by heating to 200° C. for 1 hour to obtain a gel varnish D.

| Rosin-modified phenol resin (HITANOL 270T, produced by Hitachi Chemical Co., Ltd.) | 42 parts |
|---|---|
| Low viscosity polymerized linseed oil varnish (2 poise) | 30 parts |
| Spindle oil | 27 parts |
| Ethylacetacetoaluminum diisopropylate | 1 part |

(2) Preparation of Oleophilic Ink Component

| Gel varnish D | 66 parts |
|---|---|
| Phthalocyanine Blue | 20 parts |
| Low viscosity polymerized linseed oil varnish (2 poise) | 5 parts |
| Polyethylene wax compound | 3 parts |
| Cobalt dryer | 1 part |
| Spindle oil | 5 parts |

(3) Preparation of Hydrophilic Component

| Ethylene glycol | 100 parts |
|---|---|

100 parts by weight of the oleophilic ink component obtained in the preparation of an oleophilic ink component (2) and 45 parts by weight of the hydrophilic component obtained in the preparation of a hydrophilic component (3) were mixed by agitation to prepare a W/O type emulsion ink.

Example 4

A heat-sensitive lithographic printing plate original was obtained in the same manner as in Example 3 except that the constitution of the hydrophilic layer was changed to the following. When the original plate was subjected to laser exposure in the same manner as in Example 3, image recording could be conducted without scattering of dusts due to ablation.

When the original plate was evaluated for printing in the same manner as in Example 3, the overcoat layer and the hydrophilic layer at the laser exposed part were rapidly removed from the plate surface on the printing machine in the initial stage of printing, and 20,000 sheets of printed matter having no contamination on the non-image portion and no dropout on the image portion were obtained.

Formation of Hydrophilic Layer

The following coating composition was coated on the heat-sensitive layer of Example 3, followed by drying with heat (100° C. for 10 minutes), so as to form a hydrophilic layer having a dry coating amount of 1 g/m².

Hydrophilic Layer Coating Composition 3

| Polyacrylic acid (average molecular weight: 25,000, produced by Wako Pure Chemical Industries, Ltd.) | 10 g |
|---|---|
| About 77% n-butanol solution of Titanium bis(triethanolamine)-di-n-butoxide (TAT, produced by Nippon Soda Co., Ltd.) | 2.5 g |
| Surface active agent (polyoxyethylene nonylphenol ether, EMULGEN 911, produced by Kao Crop.) | 0.15 g |
| 40% Aqueous dispersion of silica gel (particle diameter: 70 to 100 nm, SNOWTEX ZL, | 7.5 g |

-continued

| | |
|---|---|
| produced by Nissan Chemical Industries, Ltd.) | |
| Isopropanol | 50 g |
| Water | 110 g |

Comparative Example 1

A heat-sensitive lithographic printing plate original was obtained in the same manner as in Example 2 except that 1.5 g of carbon black was dispersed as a photothermal conversion substance in the heat-sensitive layer coating composition to form the heat-sensitive layer, and no overcoat layer was provided. When the original plate was subjected to laser exposure in the same manner as in Example 2, image recording could be conducted, but dusts due to ablation were scattered to contaminate the optical system. Furthermore, when printing was effected in the same manner as in Example 2, the non-image portion was contaminated, and no good printed matter was obtained.

Example 5

A lithographic printing plate original was obtained in the same manner as in Example 3 except that the constitution of the hydrophilic layer was changed to the following, and the overcoat layer was formed by the overcoat layer coating composition, from which the infrared ray absorbing dye had been removed. When the original plate was subjected to laser exposure in the same manner as in Example 3, image recording could be conducted without scattering of dusts due to ablation.

When the original plate was evaluated for printing in the same manner as in Example 3, the overcoat layer and the hydrophilic layer at the laser exposed part were rapidly removed from the plate surface on the printing machine in the initial stage of printing, and 20,000 sheets of printed matter having no contamination on the non-image portion and no dropout on the image portion were obtained.

Formation of Hydrophilic Layer 10 g of glass beads were added to a mixture containing the following components, which was agitated for 10 minutes in a paint shaker, and the glass beads were filtered off to obtain a dispersion.

The dispersion was coated on the heat-sensitive layer, followed by drying with heat (100° C. for 10 minutes), so as to form a hydrophilic layer having a dry coating amount of 2 g/m$^2$.

Hydrophilic Layer Coating Composition 4

| | |
|---|---|
| Aqueous dispersion of titanium oxide (20%) and polyvinyl alcohol (10%) | 8 g |
| Fine particles of carbon black coated with silica (particle diameter: 0.02 μm) | 2.17 g |
| Sol-gel conditioning liquid 1 (having the foregoing composition) | 2.44 g |
| Polyvinyl alcohol (10% aqueous solution) (PVA 117, produced by Kuraray Co., Ltd.) | 3.50 g |
| 20% Aqueous dispersion of silica gel (average particle diameter: about 10 nm, SNOWTEX C, produced by Nissan Chemical Industries, Ltd.) | 4 g |
| Water | 7.49 g |

Comparative Example 2

A heat-sensitive lithographic printing plate original was obtained in the same manner as in Example 5 except that no overcoat layer was provided. When the original plate was subjected to laser exposure in the same manner as in Example 5, image recording could be conducted, but dusts due to ablation were scattered to contaminate the optical system. Furthermore, when printing was effected in the same manner as in Example 5, the non-image portion was contaminated, and no good printed matter was obtained.

Examples 6 to 11

The evaluation of printing was conducted in the same manner as in Example 2 except that the hydrophilic component of the emulsion ink was changed to the compositions shown in Table 1. The overcoat layer and the hydrophilic layer at the laser exposed part were rapidly removed from the plate surface on the printing machine in the initial stage of printing, and 20,000 sheets of printed matter having no contamination on the non-image portion and no dropout on the image portion were obtained.

TABLE 1

| Example | Composition of hydrophilic component of emulsion ink |
|---|---|
| Example 6 | ethylene glycol/dipropylene glycol/glycerin = 40/10/30 |
| Example 7 | ethylene glycol/diethylene glycol = 50/50 |
| Example 8 | ethylene glycol/glycerin/water = 45/20/35 |
| Example 9 | ethylene glycol/water/diethanolamine = 50/45/5 |
| Example 10 | ethylene glycol/water/polyvinyl pyrrolidone = 80/15/5 |
| Example 11 | ethylene glycol/glycerin/water/sodium hexametaphosphate/citric acid = 45/20/25/5/5 |

Comparative Example 3

When the evaluation of printing was conducted in the same manner as in Example 2 except that Aqualess Echo Black LZ (produced by Toyo Ink MFG. Co., Ltd.), an ink for lithographic printing requiring no wetting water, was used as the printing ink, the non-image portion was contaminated and failed to obtain good printed matter. Thus, in the case where the printing was conducted by using an oleophilic ink but not using an emulsion ink, the hydrophilic layer could not sufficiently repel the ink, and the ink was attached to the whole surface.

As described in the foregoing, according to the lithographic printing process of this embodiment, the defects of the conventional heat mode prepress process using laser exposure, i.e., printing suitability, such as the printing durability and the contamination property, sensitivity and scattering of ablation dusts upon laser exposure, can be avoided. Furthermore, because the lithographic printing plate original that can be easily subjected to prepress without any developing process being used, a large number of printed matters of good quality can be stably printed in a simple manner without using wetting water.

Second Embodiment

A second embodiment of the invention will be described in more detail below.

A lithographic printing plate original that is applied to a printing process according to this embodiment has a particular hydrophilic layer that forms an non-image portion through image recording, and forms an oleophilic image portion and a hydrophilic non-image portion through image recording. When an emulsion ink used for printing is separated, an oleophilic ink component is supplied to the image portion, and a hydrophilic component is supplied to the non-image portion, whereby printed matter of high quality is stably obtained without supplying wetting water.

The emulsion ink used in this embodiment is the same as the emulsion ink of the first embodiment, and thus descriptions thereof are omitted herein.

Image Formation Process

The lithographic printing plate of this embodiment including a hydrophilic layer having an inorganic matrix formed by sol-gel conversion on the non-image portion can be obtained by conducting image recording of a lithographic printing plate original having a substrate having thereon a hydrophilic layer having an inorganic matrix formed by sol-gel conversion (hereinafter referred to as a sol-gel hydrophilic layer).

Examples of the process for image formation include the following methods. (a) On a lithographic printing plate original comprising a substrate having thereon a sol-gel hydrophilic layer, an oleophilic image portion is formed by a known method, such as an ink-jet method. (b) In a lithographic printing plate original comprising a substrate having thereon a sol-gel hydrophilic layer and an oleophilic layer in this order (in which the oleophilic layer itself or a layer adjacent thereto is heat-sensitive or light-sensitive), the oleophilic layer on the part to be the non-image portion is removed by a known heat-sensitive or light-sensitive image forming method, and thus the remaining oleophilic layer becomes the image portion. (c) In a lithographic printing plate original comprising a substrate having a oleophilic surface or a substrate having an oleophilic layer having thereon a sol-gel hydrophilic layer (in which the hydrophilic layer itself or a layer adjacent thereto is heat-sensitive or light-sensitive), the hydrophilic layer on the part to be the image portion is removed by a known heat-sensitive or light-sensitive image forming method, so as to expose the oleophilic layer to form the image portion. (d) In a lithographic printing plate original comprising a substrate having a hydrophilic layer that is converted to have oleophilicity by heating or exposure, the hydrophilic layer at a part to be the image portion is converted to have oleophilicity by a known heat-sensitive or light-sensitive image forming method to form the image portion.

Among these, a lithographic printing plate original that is subjected to image recording by a heat-sensitive image recording process, such as infrared laser exposure has such advantages that it is not exposed with light of ordinary illuminance level, such as room illumination, and an image thus recorded by heat is not necessarily fixed, and therefore it is preferably used in this embodiment.

A characteristic feature of this embodiment is that the non-image portion of the lithographic printing plate having been subjected to image formation comprises a hydrophilic layer having an inorganic matrix formed by sol-gel conversion, and as described in the foregoing, the species of the lithographic printing plate original and the method and means used for image recording are not particularly limited as long as the characteristic feature is satisfied.

As a matter of convenience herein, a lithographic printing plate original comprising a substrate having an oleophilic surface having thereon a sol-gel hydrophilic layer or a lithographic printing plate original comprising a substrate having thereon an oleophilic layer and a sol-gel hydrophilic layer in this order, both of which can be subjected to heat-sensitive image recording with laser light will be described in detail below.

Constitution of Original Plate for Lithographic Printing Plate

Examples of embodiments of the lithographic printing plate original comprising a substrate having an oleophilic surface or an oleophilic layer having thereon a hydrophilic layer, which can be subjected to image recording with an infrared laser used in this embodiment include an embodiment in which an oleophilic ink receiving layer having a photothermal conversion function and a sol-gel hydrophilic layer are formed in this order on a substrate; an embodiment in which a sol-gel hydrophilic layer and a hydrophilic overcoat layer that has a photothermal conversion function and can be removed are formed in this order on a substrate having an oleophilic ink receiving surface or having an oleophilic ink receiving layer coated thereon; and an embodiment in which a hydrophilic layer having a photothermal conversion function is formed on a substrate having an oleophilic ink receiving surface or having an oleophilic ink receiving layer coated thereon.

Sol-Gel Hydrophilic Layer

The hydrophilic layer used in this embodiment is a layer having an inorganic matrix formed by sol-gel conversion and is a layer that receives and maintains a hydrophilic component of an emulsion ink upon printing to function as the non-image portion.

The hydrophilic layer of this embodiment has an inorganic hydrophilic matrix obtained by sol-gel conversion, for example, of hydrolysis and condensation reactions of polyalkoxysilane, titanate, zirconate or aluminate.

The system capable of conducting sol-gel conversion, the siloxane resin forming a gel structure (cf. the general formula (I)) and the silane compound having at least one silanol group (cf. the general formula (II)), as well as the metallic compound, the acidic catalyst, the basic catalyst and the other additives (such as silica) are the same as those in the first embodiment, and thus descriptions thereof are omitted herein.

The ratio of the inorganic matrix formed by sol-gel conversion in the total solid content of the hydrophilic layer of this embodiment is from 5 to 100% by weight, preferably from 10 to 80% by weight, and more preferably from 20 to 70% by weight.

Examples of an organic hydrophilic polymer that can be used in the hydrophilic layer of this embodiment include polyvinyl alcohol (polyvinyl acetate having a saponification degree of 60% or more), modified polyvinyl alcohol, such as carboxyl-modified polyvinyl alcohol, starch and a derivative thereof, a cellulose derivative, such as carboxymethyl cellulose, a salt thereof and hydroxyethyl cellulose, casein, gelatin, gum arabic, polyvinyl pyrrolidone, a vinyl acetate-crotonic acid copolymer and a salt thereof, a styrene-maleic acid copolymer and a salt thereof, polyacrylic acid and a salt thereof, polymethacrylic acid and a salt thereof, polyethylene glycol, polyethyleneimine, polyvinyl sulfonic acid and a salt thereof, polystyrene sulfonic acid and a salt thereof, poly(methacryloyloxypropanesulfonic acid) and a salt thereof, polyvinyl sulfonic acid and a salt thereof, poly(methacryloyloxyethyltrimethylammoniumchloride), polyhydroxyethyl methacrylate, polyhydroxyethyl acrylate and polyacrylamide.

These polymers may be a copolymer as long as the hydrophilicity thereof is not impaired, and may be used singly or in a combination of two or more. The amount used thereof is from 2 to 50% by weight, preferably from 3 to 40% by weight, and more preferably from 5 to 30% by weight, based on the total solid content of the hydrophilic layer.

In the case where a layer having a photothermal conversion function is used as the hydrophilic layer, a photothermal conversion substance capable of absorbing laser light used for image recording and converting to heat may be contained in the hydrophilic layer. Examples of the photothermal conversion substance used in the hydrophilic layer of this embodiment include various organic and inorganic materials absorbing light having the laser wavelength used for image recording, such as, in the case where the laser light source is an infrared laser, an infrared ray absorbing dye, an infrared ray absorbing pigment, an infrared ray absorbing metal and an infrared ray absorbing metallic oxide, and those having high affinity to the hydrophilic component of the emulsion ink, particularly to water and/or a polyhydric alcohol, are preferred.

For example, suitable examples of the pigment include those having been subjected to a surface treatment by a method of surface coating a hydrophilic resin, a method of attaching a surface active agent and a method of bonding a reactive substance (such as silica sol, alumina sol, a silane coupling agent, an epoxy compound and an isocyanate compound) to the surface of the pigment (which surface treating methods are described in "Kinzoku Sekken no Seisitsu to Oyo (Nature and Application of Metallic Soap)" (published by Saiwai Shobo), "Insatsu Ink Gijutu (Printing Ink Technique)" (published by CMC Publishing, 1984) and "Saishin Ganryo Oyo Gijutu (Newest Pigment Application Technique)" (published by CMC Publications, 1986)). Among these, carbon black coated with a hydrophilic resin and carbon black modified with silica sol are preferably used since they are easily dispersed with a water soluble resin and do not impair the hydrophilicity.

Suitable examples of the fine particles of a metal or a metallic oxide include fine particles of a metal or metallic oxide having been subjected to a surface hydrophilic treatment by a method, such as a surface treatment with a surface active agent, a surface treatment with a substance having a hydrophilic group that reacts with the constitutional substance of the particles, and provision of a hydrophilic polymer film of a protective colloidal nature. What is particularly preferred is a surface silicate treatment, and for example, in the case of fine particles of iron or fine particles of triiron tetraoxide, the surface thereof can be sufficiently hydrophilic by a method of immersing in an aqueous solution of sodium silicate (3%) at 70° C. for 30 seconds. The other metallic fine particles and the other metallic oxide fine particles can be subjected to the surface silicate treatment by the similar method. The method for imparting hydrophilicity by conducting an aluminate treatment or a titanate treatment on the surface can be conducted by a similar method or a method using a surface etching assistant, such as sodium pyrophosphate, sodium carbonate and sodium hydroxide, in combination.

Among these, metallic oxide fine particles having a hydrophilic surface, particularly metallic oxide having a surface having been subjected to a silicate treatment, are preferred, and fine particles of iron oxide or iron having a surface having been subjected to a silicate treatment are especially preferred.

The infrared absorption sensitizing agent disclosed in U.S. Pat. No. 5,156,938 is preferably used as the dye, and a substituted arylbenzo(thio)pyrylium salt disclosed in U.S. Pat. No. 3,881,924, a trimethinethiapyrylium salt disclosed in JP-A-57-142645 (corresponding to U.S. Pat. No. 4,327, 169), pyrylium series compounds disclosed in JP-A-58-181051, JP-A-58-220143, JP-A-59-41363, JP-A-59-84248, JP-A-59-84249, JP-A-59-146063 and JP-A-59-146061, a cyanine dye disclosed in JP-A-59-216146, a pentamethinethiopyrylium salt disclosed in U.S. Pat. No. 4,283,475, a pyrylium compound disclosed in JP-B-5-13514 and JP-B-5-19702, and as a commercially available product, EPOLIGHT III-178, EPOLIGHT III-130 and EPOLIGHT III-125 produced by Epolin, Inc. are particularly preferably used. Among these dyes, the water soluble cyanine dye represented by the following general formula (I) is especially preferred.

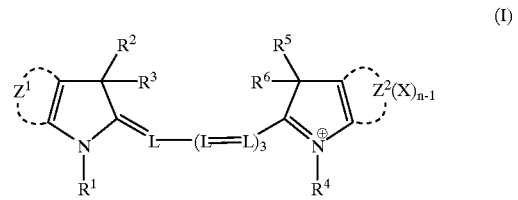

wherein $R^1$, $R^2$, $R^3$, $R^4$, $R^5$ and $R^6$ each represents a substituted or unsubstituted alkyl group; $Z^1$ and $Z^2$ each represents a substituted or unsubstituted phenyl group or a substituted or unsubstituted naphthalene group; L represents a substituted or unsubstituted methine group, wherein when the methine group has a substituent, the substituent may be an alkyl group having 8 or less carbon atoms, a halogen atom or an amino group, or in alternative the methine group may include a cyclohexane ring or a cyclopentane group which may have a substituent group formed by combining substituents on the two methine carbon atoms of the methine group, and the substituent group may be an alkyl group having 6 or less carbon atoms or a halogen atom; X represents an anionic group; n represents an integer of 1 or 2; and at least one of $R^1$, $R^2$, $R_3$, $R^4$, $R^5$, $R^6$, $Z^1$ and $Z^2$ represents an alkali metallic salt group or an amine salt group of an acidic group or a basic group, Specific examples of the water soluble cyanine dye represented by the general formula (I) are the same as those exemplified in the first embodiment (example compound (I-1) to (I-32)), and thus descriptions thereof are omitted herein.

The amount of the photothermal conversion substance used is from 2 to 50% by weight, preferably from 5 to 45% by weight, and more preferably from 10 to 40% by weight, based on the total solid content of the hydrophilic layer.

The hydrophilic layer having an inorganic matrix formed by sol-gel conversion used in this embodiment is formed by dissolving or dispersing the components in a suitable solvent, such as a polar solvent, e.g., water, methanol and ethanol, or a mixed solvent thereof, which is then coated, dried and hardened on the oleophilic layer.

The coating weight thereof is from 0.1 to 5 g/m$^2$, preferably from 0.3 to 3 g/m$^2$, and more preferably from 0.5 to 2 g/m$^2$, in terms of the weight after drying. If the coating weight after drying of the hydrophilic layer is less than 0.1 g/m$^2$, undesirable results are obtained, such as decrease of the maintaining property of the hydrophilic component of the emulsion ink and decrease of the film strength, and on the other hand, if it is too high, undesirable results are also obtained, such as decrease of the image recording sensitivity.

Oleophilic Ink Receiving Layer

The oleophilic ink receiving layer (hereinafter referred to as an oleophilic layer) used in this embodiment is a layer that receives the oleophilic ink component of the emulsion ink upon printing to function as an image portion, and a layer containing an organic polymer having an oleophilic ink receiving surface.

The oleophilic ink receiving layer used in this embodiment is coated on the substrate, or in the case where the substrate itself has an oleophilic ink receiving surface (for example, a plastic film or a substrate having a plastic film laminated thereon), the substrate may also function as the oleophilic ink receiving layer. Detailed description of the substrate (support) will be made later.

Preferred examples of the organic polymer used in the oleophilic ink receiving layer of this embodiment include those capable of forming an oleophilic film. Furthermore, it is preferred that the organic polymer is insoluble in a coating solvent for forming the hydrophilic layer as the upper layer, but in some cases, what is swollen with the coating solvent for the upper layer is preferred since it is excellent in adhesion property to the upper layer. In the case where an organic polymer that is soluble in the coating solvent for the upper layer is used, it is preferred to conduct some measures, for example, hardening by adding a crosslinking agent in advance.

Specific examples of the useful organic polymer (such as polyester, polyurethane, polyurea, polyimide, polysiloxane, polycarbonate, a phenoxy resin, an epoxy resin and a copolymer constituting the monomers generally having a molecular weight of from 10,000 to 200,000) are the same as those described in the first embodiment, and thus descriptions are omitted herein.

In the case where the oleophilic ink receiving layer has the photothermal conversion function in this embodiment, a photothermal conversion substance capable of absorbing laser light used for image recording and converting to heat may be contained in the oleophilic ink receiving layer.

Examples of the photothermal conversion substance used in the oleophilic ink receiving layer include, in the case where the laser light source is an infrared laser, various organic and inorganic materials that absorb light having the laser wavelength used for image recording, such as an infrared absorbing dye, an infrared absorbing pigment, an infrared absorbing metal and an infrared absorbing metallic oxide, and those having high affinity to the oleophilic ink component of the emulsion ink are preferred.

Examples of the pigment include various kinds of carbon black, such as acidic carbon black, basic carbon black, neutral carbon black and carbon black having been subjected to surface modification or surface coating for improving dispersibility, and a nigrosine series compound; examples of the dye include various compounds disclosed in "Sekigai Zoukan Shikiso (Infrared Sensitizing Dye)" (written by Matsuoka, Plenum Press, New York, N.Y. (1990)), U.S. Pat. No. 4,833,124, EP-321923, U.S. Pat. No. 4,772,583, U.S. Pat. No. 4,942,141, U.S. Pat. No. 4,948,776, U.S. Pat. No. 4,948,777, U.S. Pat. No. 4,948,778, U.S. Pat. No. 4,950,639, U.S. Pat. No. 4,952,552 and U.S. Pat. No. 5,023,229; and examples of the metal and the metallic oxide include aluminum, indium tin oxide, tungsten oxide, manganese oxide and titanium oxide. An electroconductive polymer, such as polypyrrole and polyaniline, can also be used.

The use amount thereof is from 2 to 50% by weight, preferably from 5 to 45% by weight, and more preferably from 10 to 40% by weight, based on the total solid content of the oleophilic ink receiving layer.

The oleophilic ink receiving layer can be formed by such a manner that the foregoing components are dissolved in an appropriate solvent and coated on the substrate. While the organic polymer may be dissolved alone, it is generally used with a crosslinking agent, an adhesive assistant, a coloring agent, inorganic or organic fine particles, a coated surface improving agent or a plasticizer. A pyrolytic compound for increasing the laser recording sensitivity and a thermal coloring system or a thermal decoloring system for forming for forming a print out image after exposure may be added.

The other additives (a crosslinking agent, an adhesive assistant, a coloring agent, a surface active agent, inorganic or organic fine particles, a pyrolytic compound for increasing the laser recording sensitivity, a plasticizer, a compound of a thermal coloring system or a thermal decoloring system and a solvent for forming the oleophilic ink receiving layer by coating) are the same as those in the first embodiment, and thus descriptions thereof are omitted herein.

The thickness of the oleophilic ink receiving layer of this embodiment is not particularly limited and may be 0.1 $g/m^2$ or more. In the case where the layer is formed on a metallic plate, the thickness is desirably 0.5 $g/m^2$ or more since it functions as a thermal insulating layer. If the oleophilic ink receiving layer is too thin, the generated heat is scattered toward the metallic plate to decrease the sensitivity. In the case of the hydrophilic metallic plate, furthermore, since it is required to have the wearing resistance, the printing durability cannot be maintained. In the case where an oleophilic plastic film is used as the substrate, the coating amount of the oleophilic ink receiving layer can be smaller than the case of the metallic film and is preferably 0.05 $\mu m$ or more.

Overcoat Layer

In the lithographic printing plate original that is applied to the process of this embodiment, an overcoat layer may be formed depending on necessity, in addition to the hydrophilic layer and the oleophilic ink receiving layer.

The overcoat layer used in this embodiment is a layer that can be easily removed before printing or upon printing similarly to the overcoat layer of the first embodiment, and a layer having a function of protecting the hydrophilic surface, and contains a polymer compound capable of forming a film. Furthermore, the overcoat layer of this embodiment may have a photothermal conversion function, and in this case, a photothermal conversion substance may be contained in the overcoat layer.

The method for providing the overcoat layer is the same as the description relating to the overcoat layer of the first embodiment, and thus descriptions thereof are omitted herein.

The sensitivity to light-sensitive or heat-sensitive recording can be improved by adding the photothermal conversion substance to the overcoat layer. Usable examples of the photothermal conversion substance include a photothermal conversion substance that absorbs the laser light used for image recording and converts to heat, and various pigments and dyes can be used. Similarly to the case of the polymer, in the case where the substance is removed by the emulsion ink, the substance is preferably easily dissolved or dispersed in water and/or a polyhydric alcohol.

In the case where an infrared laser is used as a laser light source as the recording light source, various organic and inorganic materials absorbing light of the laser wavelength used for image recording, such as an infrared ray absorbing dye, an infrared ray absorbing pigment, an infrared ray absorbing metal and an infrared ray absorbing metallic oxide, can be used, and the similar photothermal conversion substances for the hydrophilic layer can be used.

The amount of the photothermal conversion substance is from 1 to 70% by weight, and preferably from 2 to 50% by weight, based on the total solid content of the overcoat layer.

In the case of the dye, the amount is particularly preferably from 2 to 30% by weight, and in the case of the pigment, it is particularly preferably from 20 to 50% by weight. If the addition amount of the pigment or the dye is less than this, the effect of improving the sensitivity is lowered, and if it exceeds the range, the uniformity of the layer is lost to deteriorate the durability of the layer.

In the overcoat layer, a plasticizer, a pigment, a dye, a surface active agent, particles and an adhesion improving agent, for example, maybe added for improvement of the physical strength of the film, improvement of the dispersibility of the compositions constituting the film, improvement of the coating property, improvement of the removing property of the film and improvement of adhesion property to the surface of the hydrophilic layer. In the case where the overcoat layer is provided by coating an aqueous solution, a nonionic surface active agent is mainly added to improve the uniformity of coating. The details of the additives and the coating amount of the overcoat layer are the same as those of the first embodiment, and thus descriptions thereof are omitted herein.

Substrate

The substrate that can be used in the lithographic printing plate original of this embodiment and the antistatic layer to be provided associated thereto are the same as those of the first embodiment, and thus descriptions thereof are omitted herein.

The lithographic printing plate original that can be subjected to the printing process of this embodiment has the foregoing constitution. The image recording process and the printing process of the lithographic printing plate original will be described below.

Image Recording Process

In the lithographic printing plate original that can be subjected to heat-sensitive image recording by laser light, which is a representative example of a lithographic printing plate that can be subjected to the process of this embodiment, the laser light energy used for recording is absorbed by the photothermal conversion substance contained in the lithographic printing plate original of this embodiment to convert heat energy. Due to the action caused by the heat, a chemical reaction or a physical change, such as combustion, fusion, decomposition, vaporization and explosion, is caused at a laser exposed part of the lithographic printing plate original, and as a result the hydrophilic layer is removed from the lower layer or is in a removable state.

Laser light is used for imagewise exposure of the lithographic printing plate original in this embodiment. The laser used is not particularly limited as long as it can provide an exposure amount that is necessary for making the hydrophilic layer be removed or be in a removable state. Usable examples thereof include a gas laser, such as an Ar laser and a carbon dioxide gas laser, a solid laser, such as a YAG laser, and a semiconductor laser.

In general, a laser of a class having an output power of 50 mW or higher is necessary. A semiconductor laser and a solid laser excited by a semiconductor (such as a YAG laser) are preferably used from the practical standpoint of maintainability and cost. The recording wavelength of the laser is in a wavelength region of an infrared ray, and an oscillation wavelength of from 800 to 1,100 nm is often used. It is also possible to conduct the exposure by using an imaging apparatus disclosed in JP-A-6-186750.

Developing and Printing Steps

In the lithographic printing plate original thus exposed in the foregoing manner, the hydrophilic layer at the laser exposed part (image portion) may be removed during the laser exposure, and depending on necessity, the hydrophilic layer at the laser exposed part (image portion) is removed after the laser exposure, whereby the oleophilic ink receiving layer is exposed.

The removal of the hydrophilic layer at the laser exposed part can be conducted, for example, by suction, jetting of a compressed gas or a compressed liquid, application and release of an adhesive sheet and abrasion on the plate surface with an abrading member, such as a developing pad and a developing brush, in the presence or absence of a processing liquid.

As the processing liquid used in this embodiment, water or an aqueous solution containing water as the main component is preferred from the standpoint of safety, flammability and maintenance of the hydrophilicity of the surface of the hydrophilic layer, and usable examples thereof include simple water (such as tap water, pure water and distilled water) and an aqueous solution of a surface active agent (such as an anionic series, a cationic series and a nonionic series).

Processing liquids containing an alkaline agent (such as sodium carbonate, triethanolamine, diethanolamine, sodium hydroxide and a silicate), an acidic agent (such as phosphoric acid, phosphorous acid, metaphosphoric acid, pyrophosphoric acid, oxalic acid, malic acid, tartaric acid, boric acid and amino acid), and known defoaming agent and antiseptic agent may also be used.

The temperature of the processing liquid may be arbitrarily set and is preferably from 10 to 50° C.

The removal of the hydrophilic layer at the laser exposed part can be conducted by so-called on-machine development, in which the lithographic printing plate original after the laser exposure is mounted on a printing cylinder of a printing machine without having been subjected to any processing, and printing is conducted by supplying an emulsion ink to the printing plate on the printing machine.

The lithographic printing process of this embodiment is preferably conducted by using a lithographic printing machine of an offset type equipped with a known inking device.

In the process of this embodiment, when the lithographic printing plate having an image recorded is mounted on a printing machine, and printing is started by using an emulsion ink, the hydrophilic component of the emulsion ink is attached to the exposed sol-gel hydrophilic layer to form an ink repeling region (non-image portion), the exposed oleophilic layer forms a resin having affinity to the ink (image portion), and the oleophilic ink component of the emulsion ink is attached to the oleophilic ink receiving layer, so as to start printing.

EXAMPLES

The second embodiment of the invention will be described in more detail with reference to the following examples, but the invention is not construed as being limited thereto.

Example 1

Preparation of Substrate

Both surfaces of a polyethylene terephthalate film having a thickness of 180 μm were subjected to a corona discharge treatment, and the following coating composition was coated on the treated surface, followed by drying with heat (at 180° C. for 30 seconds), so as to form an antistatic layer having a dry thickness of 0.2 g/m².

Antistatic Layer Coating Composition

| | |
|---|---:|
| Aqueous dispersion of acrylic resin (solid content: 20% by weight, JULIMER ET-410, produced by Nippon Junyaku Co., Ltd.) | 20 g |
| Aqueous dispersion of tin oxide and antimony oxide (average particle diameter: 0.1 μm, 17% by weight) | 36 g |
| Polyoxyethylene nonylphenyl ether (NONIPOL 100, produced by Sanyo Chemical Industries, Ltd.) | 0.6 g |
| Aqueous solution of alkyl diphenyl ether sodium disulfonate (concentration: 40% by weight, SANDET BL, produced by Sanyo Chemical Industries, Ltd.) | 0.6 g |
| Melamine compound (concentration of active component: 80% by weight, SUMITEX RESIN M-3, produced by Sumitomo Chemical Industries, Ltd.) | 0.2 g |
| Polymethacrylic acid resin particles (average particle diameter: 5 μm, MX-500, produced by Soken Chemical and Engineering Co. Ltd.) | 0.2 g |
| Water | 42.4 g |

Formation of Oleophilic Ink Receiving Layer

Preparation of Carbon Black Dispersion

The following mixed composition was dispersed in a paint shaker for 30 minutes, and the glass beads were filtered off to prepare a carbon black dispersion.

| | |
|---|---:|
| Carbon black (MA 100, produced by Mitsubishi Chemical Corp.) | 4.0 g |
| SOLSPERSE S20000 (produced by Imperial Chemical Industries PLC) | 0.27 g |
| SOLSPERSE S12000 (produced by Imperial Chemical Industries PLC) | 0.22 g |
| Propylene glycol monomethyl ether | 10 g |
| Methyl ethyl ketone | 10 g |
| Glass beads | 120 g |

On the polyethylene terephthalate substrate having the antistatic layer coated thereon, the following coating composition was coated, followed by drying with heat (at 120° C. for 1 minute), so as to form an oleophilic ink receiving layer having a dry thickness of 1.5 g/m².

Oleophilic Ink Receiving Layer Coating Composition 1

| | |
|---|---:|
| Carbon black dispersion | 30 g |
| Methyl methacrylate/methyl acrylate/hydroxyethyl methacrylate copolymer (copolymerization ratio: 65/20/15 by mole) | 5 g |
| Polyurethane resin (condensation product of diphenylmethane diisocyanate, 2,2-dihydroxymethyl-1-propionic acid/propylene glycol (Mw: 1,000), condensation ratio: 50/30/20 by mole) | 5 g |
| 75% Isopropanol solution of Titan diisopropoxide bis(2,4-pentadionate) (AKT 855, produced by Chisso Corp.) | 1 g |

-continued

| | |
|---|---:|
| Propylene glycol monomethyl ether | 40 g |
| Methyl ethyl ketone | 50 g |

Formation of Sol-Gel Hydrophilic Layer

The following coating composition was coated on the oleophilic ink receiving layer, followed by drying with heat (100° C. for 10 minutes), so as to form a hydrophilic layer having a dry coating amount of 2 g/m², whereby a lithographic printing plate original was obtained.

Hydrophilic Layer Coating Composition 1

| | |
|---|---:|
| Aqueous dispersion of 20% of titanium oxide and 10% of polyvinyl alcohol (weight ratio: 2/1) (titanium oxide: rutile type, average particle diameter: 200 nm, produced by Wako Pure Chemical Industries, Ltd.) (polyvinyl alcohol: PVA 117 produced by Kuraray Co., Ltd.) | 8 g |
| 20% Aqueous dispersion of silica gel (average particle diameter: about 10 nm, SNOWTEX C, produced by Nissan Chemical Industries, Ltd.) | 4 g |
| Sol-gel conditioning liquid 1 (having composition below) | 4 g |
| Water | 20 g |

Preparation of Sol-gel Conditioning Liquid 1

A liquid of the following composition was aged at room temperature for 1 hour to prepare a sol-gel conditioning liquid.

| | |
|---|---:|
| Tetramethoxy silane | 11.0 g |
| Ethanol | 20.7 g |
| 0.1N Nitric acid | 4.5 g |

Image Recording

The lithographic printing plate original was exposed from the side of the hydrophilic layer by a 40 W TREND SETTER produced by CREO Inc. (plate setter having a 830 nm semiconductor laser of 40 W) with energy of 300 mJ/cm².

Thereafter, the surface of the lithographic printing plate original having been subjected to image exposure was rubbed with a developing pad having a 10% by volume aqueous solution of EU-3 (produced by Fuji Photo Film Co., Ltd.) to remove the hydrophilic layer at the laser exposed part, whereby the oleophilic ink receiving layer is exposed at the image portion, and an image was formed.

Evaluation of Printing

The lithographic printing plate original was mounted on a printing machine (Heidelberg SOR-M), and printing was effected by using an emulsion ink having the following composition. As a result, 20,000 sheets of printed matter having no contamination on the non-image portion and no dropout on the image portion were obtained.

Preparation of Emulsion Ink

Emulsion Ink Composition 1

(1) Preparation of Varnish

Hereinafter, "parts" are parts by weight.

| Varnish A | |
|---|---|
| Maleic petroleum resin (NEOPOLYMER 120, produced by Nippon Oil Co., Ltd.) | 47 parts |
| Spindle oil | 53 parts |
| Gel varnish B | |
| Rosin-modified phenol resin (TAMANOL 354, produced by Arakawa Chemical Industries, Ltd.) | 34 parts |
| Machine oil | 31 parts |
| Spindle oil | 31 parts |
| Aluminum stearate | 4 parts |
| Vanish C | |
| Gilsonite | 25 parts |
| Machine oil | 75 parts |

(2) Preparation of Oleophilic Ink Component

| | |
|---|---|
| Carbon black | 14 parts |
| Calcium carbonate (HAKUENKA DD, produced by Shiroisi Kogyo Co., Ltd.) | 5 parts |
| Varnish A | 27 parts |
| Gel varnish B | 7 parts |
| Varnish C | 11 parts |
| Linseed oil | 4 parts |
| Machine oil | 6 parts |
| Spindle oil | 24 parts |
| Cyanine Blue | 1 part |

(3) Preparation of Hydrophilic Component

| | |
|---|---|
| Purified water | 10 parts |
| Propylene glycol | 55 parts |
| Glycerin | 34 parts |
| Surface active agent (polyoxyethylene alkylphenyl ether, LIPONOX NCE, produced by Lion Corp.) | 1 part |

100 parts by weight of the oleophilic ink component obtained in the preparation of an oleophilic ink component (2) and 70 parts by weight of the hydrophilic component obtained in the preparation of a hydrophilic component (3) were mixed by agitation to prepare a W/O type emulsion ink.

Example 2

Preparation of Aluminum Substrate

A rolled plate of an aluminum material according to JIS A1050 having a thickness of 0.24 mm containing 99.5% by weight of aluminum, 0.01% by weight of copper, 0.03% by weight of titanium, 0.3% by weight of iron and 0.1% by weight of silicon was subjected to sand toothing with an aqueous suspension of PUMISTON (produced by Kyoritsu Ceramic Materials Co., Ltd.) of a concentration of 20% by weight and a rotational nylon brush (6,10-nylon), followed by well washed with water.

The aluminum plate was immersed in an aqueous solution of sodium hydroxide of a concentration of 15% by weight (containing Aluminum by 4.5 wt. %) to conduct etching to a dissolved amount of aluminum of 5 g/m$^2$, followed by washing with flowing water. The plate was neutralized with nitric acid of a concentration of 1% by weight, and further subjected to an electrolytic roughening treatment in a nitric acid aqueous solution of a concentration of 0.7% by weight (containing 0.5% by weight of aluminum) by an electric current of a block pulse alternating wave form having a voltage at an anode of 10.5 V and a voltage at a cathode of 9.3 V (current ratio: 0.90, the wave form of an electric current disclosed in the example of JP-B-58-5796) at an anodic quantity of electricity of 160 C/dm$^2$.

After washing with water, it was immersed in an aqueous solution of sodium hydroxide of a concentration of 10% by weight to effect etching to a dissolved amount of aluminum of 1 g/m$^2$, followed by washing with water. The plate was then immersed in a sulfuric acid aqueous solution of a concentration of 30% by weight at 50° C. to effect a desmut treatment, followed by washing with water.

Furthermore, the plate was subjected to a treatment for forming a porous anodic oxidation film in a nitric acid aqueous solution of a concentration of 20% by weight at 35° C. (containing 0.8% by weight of aluminum) by using a direct current. That is, electrolysis was effected at an electric density of 13 A/dm$^2$ to make the amount of the anodic oxidation film to 2.7 g/m$^2$ by adjusting the electrolysis time.

The substrate was washed with water and subjected to an immersion treatment in an aqueous solution of sodium silicate of a concentration of 0.2% by weight at 70° C. for 30 seconds, followed by washing with water and drying.

The aluminum substrate thus produced had a reflection density of 0.30 measured with a reflection densitometer, Macbeth RD920, and a center line average roughness of 0.58 μm.

Formation of Oleophilic Ink Receiving Layer

The following oleophilic ink receiving layer coating composition was coated on the aluminum substrate, followed by drying with heat (100° C. for 1 minute), so as to form an oleophilic ink receiving layer having a dry coating amount of 2 g/m$^2$.

Oleophilic Ink Receiving Layer Coating Composition 2

| | |
|---|---|
| Epoxy resin (EPICOTE 1010, produced by Yuka-Shell Epoxy Co., Ltd.) | 5 g |
| γ-Butyrolactone | 9.5 g |
| Methyl lactate | 3 g |
| Methyl ethyl ketone | 22.5 g |
| Propylene glycol monomethyl ether | 22 g |

Formation of Sol-Gel Hydrophilic Layer 10 g of glass beads were added a mixture containing the following components, and the mixture was agitated in a paint shaker for 10 minutes, followed by filtering the glass beads, to obtain a dispersion.

The dispersion was coated on the oleophilic ink receiving layer, followed by drying with heat (100° C. for 10 minutes), so as to form a hydrophilic layer having a dry coating amount of 2 g/m², whereby a lithographic printing plate original was obtained.

Hydrophilic Layer Coating Composition 2

| | |
|---|---|
| Aqueous dispersion of 20% of titanium oxide and 10% of polyvinyl alcohol (weight ratio: 2/1) (titanium oxide: rutile type, average particle diameter: 200 nm, produced by Wako Pure Chemical Industries, Ltd.) (polyvinyl alcohol: PVA 117 produced by Kuraray Co., Ltd.) | 8 g |
| Fine particles of carbon black coated with silica (particle diameter: 0.02 μm) | 2.17 g |
| Sol-gel conditioning liquid 1 (having the foregoing composition) | 16 g |
| 20% Aqueous dispersion of silica gel (average particle diameter: about 10 nm, SNOWTEX C, produced by Nissan Chemical Industries, Ltd.) | 4 g |
| Water | 7.49 g |

Image Recording

The lithographic printing plate original was subjected to imagewise laser exposure in the same manner as in Example 1 to expose the oleophilic ink receiving layer at the image portion, and an image was formed.

Evaluation of Printing

The lithographic printing plate was subjected to printing in the same manner as in Example 1, and as a result, 20,000 sheets of printed matter having no contamination on the non-image portion and no dropout on the image portion were obtained.

Example 3

Preparation of Substrate

The same antistatic layer as in Example 1 was formed on the surface opposite to an easy adhesion surface of a polyethylene terephthalate film having a thickness of 180 μm (A4100, produced by Toyobo Co., Ltd., easy adhesion surface formed on one surface).

Formation of Oleophilic Ink Receiving Layer

On the easily adhesion surface of the polyethylene terephthalate film, the following oleophilic ink receiving layer coating composition was coated, followed by drying with heat (at 100° C. for 1 minute), so as to form a substrate having an ink receiving surface of a dry coating amount of about 0.5 g/m².

Oleophilic Ink Receiving Layer Coating Composition 3

| | |
|---|---|
| N-(p-aminosulfonylphenyl)methacrylamide copolymer (polymer prepared below) | 3 g |
| Silica gel dispersion (3% methanol dispersion of methyl-modified silica gel, average particle diameter: 12 nm, R974, produced by Nippon Aerosil Co., Ltd.) | 10 g |
| γ-Butyrolactone | 9.5 g |
| Methyl lactate | 3 g |

| -continued | |
|---|---|
| Methyl ethyl ketone | 22.5 g |
| Propylene glycol monomethyl ether | 22 g |

Synthesis of Organic Polymer for Oleophilic Ink Receiving Layer

In a 200-ml three-neck flask having a stirrer, a condenser and a dropping funnel, 4.61 g (0.0192 mole) of N-(p-aminosulfonylphenyl)methacrylamide, 2.94 g (0.0258 mole) of ethyl methacrylate, 0.80 g (0.015 mole) of acrylonitrile and 20 g of N,N-dimethylacetamide were placed and agitated under heating to 65° C. over a water bath. 0.15 g of V-65 (produced by Wako Pure Chemical Industries, Ltd.) was added to the mixture, which was then stirred under a nitrogen stream for 2 hours with maintaining at 65° C. To the reaction mixture, a mixture of 4.61 g of N-(p-aminosulfonylphenyl)methacrylamide, 2.49 g of ethyl methacrylate, 0.80 g of acrylonitrile and a mixture of N,N-dimethylacetamide and 0.15 g of V-65 was added dropwise from the dropping funnel over 2 hours. After completing the dropping, the reaction mixture was further stirred for 2 hours at 65° C. After completing the reaction, the reaction mixture was cooled by adding 40 g of methanol and put in 2 L of water under stirring, followed by stirring for 30 minutes, and then 15 g of a white solid matter was obtained by filtration and drying. The weight average molecular weight (polystyrene standard) of the N-(p-aminosulfonylphenyl)methacrylamide copolymer measured by gel permeation chromatography was 53,000.

Formation of Sol-Gel Hydrophilic Layer

The following coating composition was coated on the oleophilic ink receiving layer, followed by drying with heat (100° C. for 10 minutes), so as to form a hydrophilic layer having a dry coating amount of 1 g/m², whereby a lithographic printing plate original was obtained.

Hydrophilic Layer Coating Composition 3

| | |
|---|---|
| Methanol silica (produced by Nissan Chemical Industries, Ltd., colloid of methanol solution containing 30% by weight of silica particles of from 10 to 20 nm) | 9 g |
| Sol-gel conditioning liquid 2 (having the following composition) | 16 g |
| Methanol | 100 g |
| Methyl lactate | 5 g |

Preparation of Sol-gel Conditioning Liquid 2

A liquid of the following composition was aged at room temperature for 1 hour to prepare a sol-gel conditioning liquid.

| | |
|---|---|
| Tetramethoxy silane | 42.5 g |
| Methanol | 9 g |
| Water | 73 g |
| Phosphoric acid | 0.065 g |

Formation of Overcoat Layer

The following coating composition was coated on the hydrophilic layer, followed by drying with heat (100° C. for 2 minutes), so as to form an overcoat layer having a dry coating amount of about 0.6 g/m². Thus, a lithographic printing plate original was completed.

Overcoat Layer Coating Composition

| | |
|---|---|
| Polyacrylic acid (weight average molecular weight: 25,000, produced by Wako Pure Chemical Industries, Ltd.) | 1 g |
| Infrared ray absorbing dye (example compound (1-32)) | 0.2 g |
| Polyoxyethylene nonylphenyl ether | 0.025 g |
| Water | 19 g |

Image Recording and Evaluation of Printing

The lithographic printing plate original was subjected to imagewise exposure from the side of the overcoat layer in the same manner as in Example 1.

The lithographic printing plate original having been subjected to the laser exposure was mounted on a printing machine (Heidelberg SOR-M) without subjecting to any treatment, and printing was effected by using emulsion ink having composition 1. As a result, the overcoat layer and the hydrophilic layer at the laser exposed part were rapidly removed from the plate surface on the printing machine in the initial stage of printing, and the oleophilic ink receiving layer was exposed in the image portion, whereby 20,000 sheets of printed matter having no contamination on the non-image portion and no dropout on the image portion were obtained.

Examples 4 and 5

Printing was effected in the same manner as in Examples 1 to 3 except that an emulsion ink having the following composition was used, and as a result 20,000 sheets of printed matter having no contamination on the non-image portion and no dropout on the image portion were obtained.

Preparation of Emulsion Ink

Emulsion Ink Composition 2

(1) Preparation of Varnish

Hereinafter, "parts" are parts by weight.

The following composition was gelled by heating to 200° C. for 1 hour to obtain a gel varnish D.

| | |
|---|---|
| Rosin-modified phenol resin (HITANOL 270T, produced by Hitachi Chemical Co., Ltd.) | 42 parts |
| Low viscosity polymerized linseed oil varnish (2 poise) | 30 parts |
| Spindle oil | 27 parts |
| Ethylacetacetoaluminum diisopropylate | 1 part |

(2) Preparation of Oleophilic Ink Component

| | |
|---|---|
| Gel varnish D | 66 parts |
| Phthalocyanine Blue | 20 parts |
| Low viscosity polymerized linseed oil varnish (2 poise) | 5 parts |
| Polyethylene wax compound | 3 parts |

-continued

| | |
|---|---|
| Cobalt dryer | 1 part |
| Spindle oil | 5 parts |

(3) Preparation of Hydrophilic Component

| | |
|---|---|
| Ethylene glycol | 100 parts |

100 parts by weight of the oleophilic ink component obtained in the preparation of an oleophilic ink component (2) and 45 parts by weight of the hydrophilic component obtained in the preparation of a hydrophilic component (3) were mixed by agitation to prepare a W/O type emulsion ink.

Examples 7 to 12

The evaluation of printing was conducted in the same manner as in Example 3 except that the hydrophilic component of the emulsion ink was changed to the compositions shown in Table 1. The overcoat layer and the hydrophilic layer at the laser exposed part were rapidly removed from the plate surface on the printing machine in the initial stage of printing to expose the oleophilic ink receiving layer at the image portion, and 20,000 sheets of printed matter having no contamination on the non-image portion and no dropout on the image portion were obtained.

TABLE 1

| Example | Composition of hydrophilic component of emulsion ink | Weight ratio |
|---|---|---|
| Example 7 | ethylene glycol/dipropylene glycol/glycerin | 40/10/30 |
| Example 8 | ethylene glycol/diethylene glycol | 50/50 |
| Example 9 | ethylene glycol/glycerin/water | 45/20/35 |
| Example 10 | ethylene glycol/water/diethanolamine | 50/45/5 |
| Example 11 | ethylene glycol/water/polyvinyl pyrrolidone | 80/15/5 |
| Example 12 | ethylene glycol/glycerin/water/sodium hexametaphosphate/citric acid | 45/20/25/5/5 |

Comparative Example 1

When the evaluation of printing was conducted in the same manner as in Example 3 except that Aqualess Echo Black LZ (produced by Toyo Ink MFG. Co., Ltd.), an ink for lithographic printing requiring no wetting water, was used as the printing ink, the non-image portion was contaminated and failed to obtain good printed matter. Thus, in the case where the printing was conducted by using an oleophilic ink but not using an emulsion ink, the hydrophilic layer could not sufficiently repel the ink to contaminate the non-image portion, and good printed matter could not be obtained.

Comparative Example 2

A lithographic printing plate was obtained by imagewise exposure of an ordinary PS plate having an aluminum surface as a non-image portion (VS, produced by Fuji Photo Film Co., Ltd.), followed by subjecting to the developing process. When the lithographic printing plate was subjected to printing by using the emulsion ink (composition 1) in the same manner as in Example 1, background contamination occured in the non-image portion even in the case where the emulsion ink was used, because of insufficient affinity of the non-image portion to the hydrophilic component other than water contained in the emulsion ink, whereby good printed matter could not be obtained.

As described in the foregoing, according to the lithographic printing process of this embodiment, a lithographic printing plate having a hydrophilic layer having an inorganic matrix formed by sol-gel conversion at the non-image portion is formed, and printing is effected by using an emulsion ink formed in such a manner that a hydrophilic component containing water and/or a polyhydric alcohol as the main component is added to an oleophilic oil component, followed by subjecting to emulsification. According to the process, a high quality printed matter can be stably obtained in a simple manner.

What is claimed is:

1. A lithographic printing process comprising:
   (a) a step of providing an overcoat layer, which can be removed during printing, on a heat-sensitive lithographic printing plate original which includes a step of sequentially providing a hydrophilic layer and said overcoat layer on a heat-sensitive layer having an ink receiving surface;
   (b) a step of conducting image recording on said lithographic printing plate original provided with said overcoat layer which includes a step of subjecting to thermal action a surface of said heat-sensitive layer at a heating region, and, subsequent to said step of subjecting to thermal action, a step of decreasing adhesion between said heat-sensitive layer and said hydrophilic layer for forming an image portion at which said hydrophilic layer is removable; and
   (c) a step of printing, after said image recording, using emulsion ink that has been obtained by adding and emulsifying a hydrophilic component, which contains at least one of water and a polyhydric alcohol as a main component, into an oleophilic ink component, said step including a step of removing said overcoat layer and said heated region of said hydrophilic layer by supplying said emulsion ink to a plate surface during printing.

2. The lithographic printing process as claimed in claim 1, wherein the hydrophilic layer is a hydrophilic layer containing an inorganic matrix formed by sol-gel conversion.

3. The lithographic printing process as claimed in claim 1, wherein said step (a) of providing said overcoat layer on said lithographic printing plate original includes a step of adding a photothermal conversion agent, which converts laser light to heat, to said overcoat layer.

4. A lithographic printing process as claimed in claim 1, wherein said step (c) of printing using emulsion ink includes: a step of separating said emulsion ink into said oleophilic ink component and said hydrophilic component during printing; a step of removing, with said hydrophilic component, said overcoat layer and said image portion of said hydrophilic layer; and a step of supplying said oleophilic ink component to said image portion and said hydrophilic component to said non-image portion.

5. A lithographic printing process comprising:
   (a) a step of conducting image recording on a lithographic printing plate original having a hydrophilic layer which contains an inorganic matrix formed by sol-gel conversion and an organic hydrophilic polymer;
   (b) a step of forming a lithographic printing plate in which a non-image portion is constituted of the hydrophilic layer; and
   (c) a step of conducting printing by using emulsion ink that has been obtained by adding and emulsifying a hydrophilic component, which contains at least one of water and a polyhydric alcohol as a main component, into an oleophilic ink component.

6. The lithographic printing process as claimed in claim 5, wherein the inorganic matrix formed by sol-gel conversion and contained in said hydrophilic layer is a polymeric body having a resin-like structure, in which bonding groups which are derived from a polyvalent element form a network structure via oxygen atoms and a polyvalent metal has at least one of a non-bonded hydroxyl group and a non-boned alkoxyl group.

7. The lithographic printing process as claimed in claim 6, wherein said polymeric body is a resin having a siloxane bond and a silanol group, and is a polymeric body which is formed by a gelation of a material that is a sol system containing said silane compound having at least one silanol group.

8. The lithographic printing process as claimed in claim 5, wherein the emulsion ink comprises an oleophilic ink component and a hydrophilic component, said oleophilic ink component comprising at least one polyhydric alcohol selected from the group consisting of glycerin, ethylene glycol, diethylene glycol, propylene glycol and dipropylene glycol in an amount of 50 to 100% by weight of the oleophilic ink component and said hydrophilic component being present in an amount of 20 to 100 parts by weight per 100 parts by weight of the oleophilic ink component.

9. The lithographic printing process as claimed in claim 5, wherein the hydrophilic layer includes the organic hydrophilic polymer in an amount of 20 to 99% by weight.

10. A lithographic printing process comprising:
    (a) a step of providing an overcoat layer, which can be removed during printing, on a heat-sensitive lithographic printing plate original;
    (b) a step of conducting image recording on said lithographic printing plate original provided with said overcoat layer; and
    (c) a step of printing, after said image recording, using emulsion ink comprising an oleophilic ink component and a hydrophilic component, said oleophilic ink component comprising at least one polyhydric alcohol selected from the group consisting of glycerin, ethylene glycol, diethylene glycol, propylene glycol and dipropylene glycol in an amount of 50 to 100% by weight of the oleophilic ink component and said hydrophilic component being present in an amount of 20 to 100 parts by weight per 100 parts by weight of the oleophilic ink component.

* * * * *

UNITED STATES PATENT AND TRADEMARK OFFICE
CERTIFICATE OF CORRECTION

PATENT NO. : 6,632,589 B2 Page 1 of 1
DATED : October 14, 2003
INVENTOR(S) : Toshifumi Inno et al.

It is certified that error appears in the above-identified patent and that said Letters Patent is hereby corrected as shown below:

Column 62,
Lines 27 and 47, change "oleophilic ink" to -- hydrophilic --.

Signed and Sealed this

Sixth Day of January, 2004

JAMES E. ROGAN
*Director of the United States Patent and Trademark Office*